United States Patent
Jung et al.

(10) Patent No.: US 10,228,786 B2
(45) Date of Patent: Mar. 12, 2019

(54) MOBILE TERMINAL COMPRISING STYLUS PEN AND TOUCH PANEL

(71) Applicant: LG ELECTRONICS INC., Seoul (KR)

(72) Inventors: Kihyun Jung, Seoul (KR); Hyunjai Shim, Seoul (KR); Jungjoon Lee, Seoul (KR); Masashi Hashimoto, Seoul (KR); Jinho Choi, Seoul (KR); Jeongkyo Seo, Seoul (KR); Younghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 357 days.

(21) Appl. No.: 14/915,152

(22) PCT Filed: Aug. 25, 2014

(86) PCT No.: PCT/KR2014/007901
§ 371 (c)(1),
(2) Date: Feb. 26, 2016

(87) PCT Pub. No.: WO2015/030452
PCT Pub. Date: Mar. 5, 2015

(65) Prior Publication Data
US 2016/0209957 A1    Jul. 21, 2016

(30) Foreign Application Priority Data

Aug. 30, 2013  (KR) ........................ 10-2013-0103720
Mar. 28, 2014  (KR) ........................ 10-2014-0036475
Aug. 1, 2014   (KR) ........................ 10-2014-0099289

(51) Int. Cl.
*G06F 3/041*    (2006.01)
*G06F 3/0488*   (2013.01)
(Continued)

(52) U.S. Cl.
CPC ............ *G06F 3/0412* (2013.01); *G06F 3/017* (2013.01); *G06F 3/03545* (2013.01);
(Continued)

(58) Field of Classification Search
CPC ...... G06F 3/041; G06F 3/0412; G06F 3/0414; G06F 3/0416; G06F 3/044; G06F 3/03545
See application file for complete search history.

(56) References Cited

U.S. PATENT DOCUMENTS

2008/0150550 A1   6/2008   Vos
2012/0256869 A1   10/2012  Walsh et al.
(Continued)

FOREIGN PATENT DOCUMENTS

| JP | 4866941 | 2/2012 |
|----|---------|--------|
| KR | 10-2011-0091459 | 8/2011 |
| KR | 10-2013-0051097 | 5/2013 |

OTHER PUBLICATIONS

Korean Intellectual Property Office Application Serial No. 10-2014-0099289, Office Action dated Nov. 23, 2015, 4 pages.
(Continued)

*Primary Examiner* — David Tung
(74) *Attorney, Agent, or Firm* — Lee, Hong, Degerman, Kang & Waimey

(57) ABSTRACT

A mobile terminal having a stylus pen and a touch panel is provided. The mobile terminal includes a touch panel having a plurality of touch panel electrodes, and a stylus pen provided to transmit and receive an electrical signal to and from the touch panel using capacitive coupling, wherein the stylus pen includes a main body, a pen tip formed of a conductor and protruding to outside of the main body to apply a touch to the touch panel, and an LC circuit provided within the main body, configured to include an inductor and
(Continued)

a capacitor, and electrically connected to the pen tip to generate capacitive coupling between the LC circuit an the touch panel.

19 Claims, 21 Drawing Sheets

(51) Int. Cl.
  *G06F 3/01* (2006.01)
  *G06F 3/0484* (2013.01)
  *G06F 3/0354* (2013.01)
  *G06F 3/044* (2006.01)

(52) U.S. Cl.
  CPC ............ *G06F 3/044* (2013.01); *G06F 3/0416* (2013.01); *G06F 3/0484* (2013.01); *G06F 3/04883* (2013.01)

(56) References Cited

U.S. PATENT DOCUMENTS

| | | | |
|---|---|---|---|
| 2012/0268423 A1 | 10/2012 | Hotelling et al. | |
| 2012/0327042 A1* | 12/2012 | Harley | G06F 3/03545 345/179 |
| 2013/0009907 A1* | 1/2013 | Rosenberg | G06F 3/046 345/174 |
| 2013/0300708 A1* | 11/2013 | Kim | G06F 3/0416 345/174 |
| 2014/0028607 A1* | 1/2014 | Tan | G06F 3/044 345/174 |
| 2014/0240298 A1* | 8/2014 | Stern | G06F 3/0383 345/179 |
| 2014/0285465 A1* | 9/2014 | Hayashi | G06F 3/044 345/174 |
| 2015/0049052 A1* | 2/2015 | Atkinson | G06F 3/0416 345/174 |

OTHER PUBLICATIONS

PCT International Application No. PCT/KR2014/007901, Written Opinion of the International Searching Authority dated Dec. 17, 2014, 1 pages.

* cited by examiner (a)

(b)

(c)

(a)                      (b)

(c)

(a)

(b)

(a)

TX ELECTRODE LINE

RX ELECTRODE LINE (b)

(c)

US 10,228,786 B2

MOBILE TERMINAL COMPRISING STYLUS PEN AND TOUCH PANEL

CROSS-REFERENCE TO RELATED APPLICATIONS

This application is the National Stage filing under 35 U.S.C. 371 of International Application No. PCT/KR2014/007901, filed on Aug. 25, 2014, which claims the benefit of Korean Application Nos. 10-2013-0103720, filed on Aug. 30, 2013, 10-2014-0036475, filed on Mar. 28, 2014, and 10-2014-0099289, filed on Aug. 1, 2014, the contents of which are all hereby incorporated by reference herein in their entirety.

TECHNICAL FIELD

The present invention relates to a mobile terminal including a stylus pen and a touch panel and, more particularly, to a mobile terminal capable of transmitting and receiving an electrical signal between a touch panel and a stylus pen.

BACKGROUND ART

Touch panels are used as a means for inputting characters or figures in mobile phones or personal computers. Touch panels perform signal processing of sensing a touch of a hand or a stylus pen and converting the sensed touch into an electrical signal.

When an electronic circuit is installed in a stylus pen, the stylus pen may perform a mouse function such as generating an electrical signal to select or drag a portion of an image, as well as performing a simple touch input.

When an electronic circuit is installed in a stylus pen, electric power is required to operate the electronic circuit of the stylus pen. For example, a method of installing a battery in the stylus pen and supplying electric power from the installed battery may be used.

Meanwhile, recently, a method of installing a dedicated panel for supplying power in a main body of a mobile phone and wirelessly supplying required power to the stylus pen from the dedicated panel is used.

(Patent document 1) JP 4866941 B

A power supply technique disclosed in Patent document 1 is performed by a power transmission device 4 disposed below an LCD module 3 in a smart phone. Here, the power transmission device 4 transmits electric power to a coil within a stylus pen by an induction coil. That is, in the Patent document 1, in order to supply electric power to the stylus pen, the power transmission device including the induction coil is disposed below the LCD module and electric power is transmitted and received through inductive coupling between a coil provided in the stylus pen and a coil provided in the power transmission device.

However, installation of the power transmission device including the induction coil below the LCD module to supply electric power to the stylus pen increases cost to lead to an increase in a thickness of a mobile phone.

Also, in a case in which electrode lines of a touch panel are formed of a coil, a resistance component by electrode lines of the touch panel is so great that energy is emitted as thermal energy by resistance before a circuit is resonated, causing a problem that the circuit is not resonated eventually.

In order to solve the problem, a need for a technique of supplying electric power to a stylus pen using an existing touch panel and sensing a signal received from the stylus pen, without using a separate power transmission device, has increased.

DISCLOSURE

Technical Problem

Therefore, an object of the present disclosure is to provide a device capable of detecting pen pressure of a user input unit such as a stylus pen which does not have a complicate circuit and which is not required to install a separate battery, or the like, or a button input, and a touch panel including the device.

Another object of the present disclosure is to provide a mobile terminal including a stylus pen and a touch panel allowing an electrical signal to be transmitted and received therebetween in a capacitive coupling manner.

Another object of the present disclosure is to provide a mobile terminal including a stylus pen and a touch panel, capable of increasing a magnitude of an electrical signal transmitted and received using a capacitive coupling scheme.

Another object of the present disclosure is to provide a mobile terminal including a stylus pen and a touch panel, capable of providing a new user interface using a change in a magnitude of an electrical signal transmitted and received through a capacitive coupling scheme.

Technical Solution

According to an aspect of the present disclosure, there is provided a touch panel configured to detect a touch position by using a change in capacitance of a plurality of touch panel electrodes arranged in a first direction and a second direction, including: a pen signal detecting device configured to be connected to at least one of the plurality of touch panel electrodes, and detect pen pressure of an input unit brought into contact with the plurality of touch panel electrodes, wherein the pen signal detecting device includes: an alternating current (AC) signal generating unit configured to generate an AC signal to be transmitted to the plurality of touch panel electrodes; a pen pressure detecting unit configured to receive a signal transmitted from the input unit by way of the plurality of touch panel electrodes, and determine pen pressure applied to the input unit; and a switching unit configured to cause the plurality of touch panel electrodes to be selectively connected to the AC signal generating unit or cause the plurality of touch panel electrodes to be selectively connected to the pen pressure detecting unit.

According to an aspect of the present disclosure, there is provided a touch panel in which a plurality of transmission (TX) lines and a plurality of reception (RX) lines are disposed to intersect with each other in order to detect a touch position in a capacitive manner, including: a power supply unit configured to selectively apply an alternating current (AC) voltage to the plurality of TX lines and the plurality of RX lines in order to generate capacitive coupling with an external LC circuit.

According to an aspect of the present disclosure, there is provided a touch panel used in a touch screen, including: a plurality of TX lines arranged as driving electrodes; a plurality of RX lines arranged as sensing electrodes and intersecting with the plurality of TX lines; a first voltage source configured to generate a pulse voltage to be transmitted to the plurality of TX lines; a second voltage source configured to generate an alternating current (AC) voltage to be selectively transmitted to the plurality of TX lines and the plurality of RX lines; and a signal receiving unit configured to process a signal transmitted from the plurality of TX lines and the plurality of RX lines.

According to an aspect of the present disclosure, there is provided a mobile terminal having a stylus pen, including: a touch panel having a plurality of touch panel electrodes; and a stylus pen provided to transmit and receive an electrical signal to and from the touch panel using capacitive coupling, wherein the stylus pen includes: a main body; a pen tip formed of a conductor and protruding to outside of the main body to apply a touch to the touch panel; and an LC circuit provided within the main body, configured to include an inductor and a capacitor, and electrically connected to the pen tip to generate capacitive coupling between the LC circuit an the touch panel.

In an embodiment of the present disclosure, the electrical signal may be transmitted and received between the touch panel and the LC circuit through the pen tip formed of a conductor.

In an embodiment of the present disclosure, the stylus pen may receive an electrical signal transmitted from the touch panel through the pen tip formed of a conductor, and supply the received electrical signal to the LC circuit electrically connected to the pen tip to cause resonance to occur in the LC circuit.

In an embodiment of the present disclosure, the pen tip may have a conic shape having one base side and one vertex and may be disposed such that the vertex is oriented to an outer side of the main body, and a magnitude of the electrical signal received by the stylus pen may be increased in proportion to a degree to which the pen tip is tilted in relation to the vertex.

In an embodiment of the present disclosure, the LC circuit may further include a variable capacitor whose capacitance is varied on the basis of pressure applied to the pen tip, and the touch panel may detect a touch point on the basis of a change in the capacitance of the variable capacitor according to a touch operation of the stylus pen.

In an embodiment of the present disclosure, a first electrical signal applied from the LC circuit to the touch panel may be converted into a second electrical signal according to a change in the capacitance, and the mobile terminal may further include a control unit configured to sense the second electrical signal to determine a touch point in the touch panel.

In an embodiment of the present disclosure, the second electrical signal may be transmitted to the touch panel through the pen tip formed of a conductor.

In an embodiment of the present disclosure, the pen tip may have a conic shape having one base side and one vertex and may be disposed such that the vertex is oriented to an outer side of the main body, and a magnitude of the second electrical signal transmitted from the stylus pen may be increased in proportion to a degree to which the pen tip is tilted in relation to the vertex.

In an embodiment of the present disclosure, the control unit may determine a point at which a magnitude of the second electrical signal is equal to or greater than a threshold value, as a touch point, among points at which the second electrical signal is detected.

In an embodiment of the present disclosure, in a case in which the second electrical signal having a magnitude equal to or greater than the threshold value is received in one region of the touch panel as the stylus pen is tilted, the touch point may be determined on the basis of the detected one region.

In an embodiment of the present disclosure, a magnitude of the second electrical signal detected in the one region may be varied according to a distance between the touch panel and a side surface of the pen tip, and the control unit may determine the touch point on the basis of the magnitude of the second electrical signal detected in the one region.

In an embodiment of the present disclosure, the touch point may be determined as a point at which the second electrical signal is the greatest.

In an embodiment of the present disclosure, a non-conductive protective member may be provided on the vertex of the pen tip, and when a shape of the one region corresponds to a preset shape, the control unit may determine a point outside of the one region, as the touch point.

In an embodiment of the present disclosure, the pen tip may be formed as a hemisphere and may be disposed such that the base side of the hemisphere is in contact with the main body, and an electrical signal transmitted and received between the touch panel and the stylus pen may be uniformly maintained even though the stylus pen is tilted.

In an embodiment of the present disclosure, the stylus pen may further include a conductive member provided within the main body and electrically connected to the LC circuit to increase a magnitude of the electrical signal.

In an embodiment of the present disclosure, the plurality of touch panel electrodes may include: a plurality of driving electrodes in array; and a plurality of sensing electrodes arranged to intersect with the plurality of driving electrodes, wherein a width of each of the plurality of driving electrodes is larger than a width of each of the plurality of sensing electrodes.

In an embodiment of the present disclosure, the mobile terminal may further include: a display unit disposed to overlap the touch panel; and a control unit configured to output an image corresponding to a touch trace of the stylus pen on the display unit on the basis of a touch applied by the stylus pen, wherein the control unit may output the image in different manners according to a degree to which the pen tip is tilted.

In an embodiment of the present disclosure, the pen tip may have a conic shape having one base side and one vertex and may be disposed such that the vertex is oriented to an outer side of the main body, and a degree to which the pen tip is tilted may be determined on the basis of a size of the one region of the touch panel in which the electrical signal having a magnitude equal to or greater than the threshold value is detected.

In an embodiment of the present disclosure, an image corresponding to the touch trace may include a line corresponding to the touch trace, and the control unit may display at least one of a thickness and a color of the line differently according to a degree to which the stylus pen is tilted.

In an embodiment of the present disclosure, in a state in which the image is output, when a drag touch is applied in a state in which the pen tip is tilted at a slope equal to or greater than a preset slope, the control unit may delete the image overlapping a trace of the drag touch.

According to an aspect of the present disclosure, there is provided a stylus pen including: a main body; a pen tip formed of a conductor and configured to protrude to outside of the main body to apply a touch to a touch panel; and an LC circuit provided within the main body, including an inductor and a capacitor, and electrically connected to the pen tip to generate capacitive coupling between the LC circuit and the touch panel, wherein the LC circuit transmits and receives an electrical signal to and from the touch panel using capacitive coupling.

In an embodiment of the present disclosure, the electrical signal may be transmitted and received between the touch panel and the LC circuit through the pen tip formed of a conductor.

In an embodiment of the present disclosure, the LC circuit may receive an electrical signal transmitted from the touch panel through the pen tip formed of a conductor and cause resonance to occur by using the received electrical signal.

In an embodiment of the present disclosure, the pen tip may have a conic shape having one base side and one vertex and may be disposed such that the vertex is oriented to an outer side of the main body, and a magnitude of the electrical signal received by the pen tip may be increased in proportion to a degree to which the pen tip is tilted in relation to the vertex.

In an embodiment of the present disclosure, the LC circuit may further include a variable capacitor whose capacitance is varied on the basis of pressure applied to the pen tip, and the LC circuit may convert a first electrical signal applied to the touch panel into a second electrical signal on the basis of a change in the capacitance of the variable capacitor according to a touch operation of the stylus pen.

In an embodiment of the present disclosure, the second electrical signal may be transmitted to the touch panel through the pen tip formed of a conductor.

Advantageous Effects

According to embodiments of the present disclosure, an electrode of an existing touch panel may be used and, since a resonance excitation AC signal may be easily transmitted, there is no need to separately configure a power supply unit within a stylus pen. Also, since pen pressure is detected using pen pressure signal (LC resonance signal) transmitted from a pen, and thus, pen pressure may be more accurately measured.

According to the touch panel of the embodiment of the present disclosure, since there is no need to separately configure a circuit for transmitting electric power to the pen within a touch-based device such as a smart phone or a tablet PC, and thus, a thickness of the touch-based device may be reduced. Also, only a circuit for wirelessly transmitting power to the circuit of the touch panel may be required, and since a frequency of an alternating current (AC) voltage supplied from a power source to a transmission (TX) line and a reception (RX) line of the touch panel is only required to be smaller than a cutoff frequency, the circuit may have a simple structure.

According to an embodiment of the present disclosure, an electrical signal may be transmitted and received with a stylus pen by using an existing touch panel. Thus, since there is no need to provide a separate power supply device formed as a coil, cost may be reduced and a thickness of a mobile terminal may be further reduced.

Also, in an embodiment of the present disclosure, an electrical signal may be supplied to the stylus pen through capacitive coupling, and a touch may be applied to the touch panel through an electrical signal generated in a resonant state. Thus, in an embodiment of the present disclosure, a stylus pen configured to include only a simple circuit without having a separate power supply unit may be provided, and thus, cost may be reduced and a weight of the stylus pen may be reduced.

In addition, in an embodiment of the present disclosure, by electrically connecting an LC circuit provided in a stylus pen and a pen tip formed of a conductor, a magnitude of an electrical signal transmitted and received between the stylus pen and the touch panel through a capacitive coupling scheme may be increased. That is, in an embodiment of the present disclosure, the pen tip may be formed of a conductor and electrically connected to the LC circuit, thus serving to reduce a distance between a capacitor of the LC circuit and a touch panel electrode. Here, the capacitive coupling scheme allows an electrical signal to be more easily transmitted and received as a distance is short according to characteristics of a capacitor. Thus, in an embodiment of the present disclosure, a touch recognition rate by the stylus pen may be significantly increased.

Also, in an embodiment of the present disclosure, by forming a pen tip as a conductor to have a conic shape, a magnitude of an electrical signal transmitted and received between the touch panel and the stylus pen may be increased as the pen tip is tilted. That is, according to the capacitive coupling scheme, when a cross-sectional area is increased, an electrical signal may be more easily transmitted and received according to characteristics of a capacitor. Thus, the present disclosure solves the related art problem in which a recognition rate is lowered in a case in which a stylus pen is tilted when an electrical signal is transmitted and received using inductive coupling, and in addition, the present disclosure further increases a touch recognition rate based on the stylus pen by tilting the stylus pen.

Also, in a case in which an electrical signal having a magnitude of a signal equal to or greater than a threshold value is sensed in one region of the touch panel as the pen tip having a conic shape is tilted, a touched point may be determined according to a preset scheme. Thus, in an embodiment of the present disclosure, a magnitude of an electrical signal transmitted and received between the touch panel and the stylus pen may be increased as the stylus pen is tilted, and a problem in which accuracy of a touched point is degraded as the electrical signal is sensed in one region may be solved.

Also, in an embodiment of the present disclosure, as the pen tip of the stylus pen is tilted, a size of a region in which the electrical signal having a magnitude equal to or greater than the threshold value is sensed in the touch panel may be changed. That is, different functions may be executed on the basis of tilting of the stylus pen. Thus, the present disclosure may provide a new user interface providing different functions according to tilting of the stylus pen.

In addition, in an embodiment of the present disclosure, since a width of a driving electrode is greater than a width of a sensing electrode, a recognition rate with respect to an electrical signal received from the stylus pen may be increased.

BEST MODES

Hereinafter, embodiments of the present disclosure will be described in detail with respect to the accompanying drawings. However, the scope of the present disclosure may be determined from the disclosure of the embodiments and the concept of the present disclosure may include modifications such as addition, deletion, and change of components of the proposed embodiments.

In the following description, usage of suffixes such as 'unit' or 'part' used for referring to elements is given merely to facilitate explanation of the present invention, without having any significant meaning by itself.

In the following description, a stylus pen will be described as an example of a unit for inputting a user command to a touch panel. The present disclosure relates to a method of supplying an electrical signal to a stylus pen and detecting an electrical signal transmitted from the stylus pen. The present disclosure relates to a device for transmitting an LC resonance signal generated in a stylus pen to an electrode of a touch panel through coupling capacitance (or capacitive coupling) formed between the pen and the touch panel, and detecting a frequency of a received signal by a pen pressure detecting unit connected to one end of the electrode of the touch panel. Also, as a transmission path of a signal between the pen and the pen pressure detecting unit, a touch panel for detecting a touch position in a capacitive manner, and, specifically, a driving electrode Tx or a sensing electrode Rx of the touch panel, is used.

In particular, pen pressure of the pen may be detected from a signal transmitted from the pen by the pen pressure detecting unit, and a degree of force that the user applies to the touch panel may be determined. However, for the purposes of description, pen pressure of the stylus pen is described, but a case in which a button for changing capacitance of a capacitor provided in the stylus pen is provided may also belong to the technical concept of the present disclosure.

Figure 1:
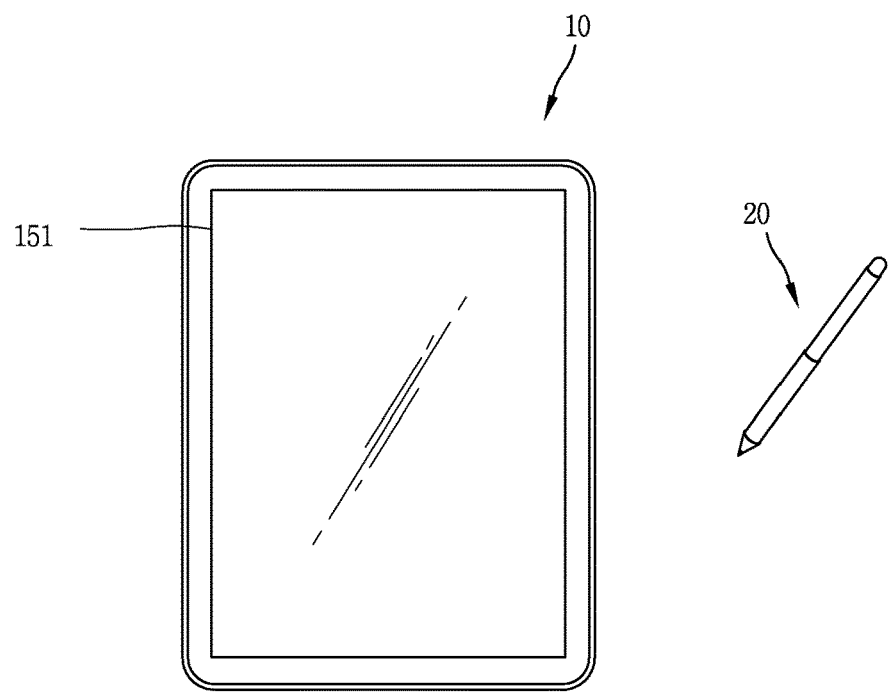
FIG. 1 is a conceptual view illustrating a mobile terminal having a stylus pen.

FIG. 1 is a conceptual view illustrating a mobile terminal having a stylus pen.

The mobile terminal according to an embodiment of the present disclosure may include a detection region 151 (or a display unit 151) for detecting a position of a touch (or an input) applied by at least one of a stylus pen (hereinafter, referred to as a "pen") as a first input unit and a finger as a second input unit. In the detection region 151, a protective cover formed of glass or acryl is disposed, and a display panel such as a liquid crystal display (LCD) or an OLED is disposed below the protective cover. A signal transmitted from a control unit such as a computer, or the like, is displayed on the touch panel.

As known, by manipulating a pen 20 in the detection region 151, a drawing may be made, or a letter may be written, or a region of a displayed image may be selected according to pen manipulation on the display panel. This is the same as a case in which a user performs inputting with his or her finger. A case in which the user applies a touch or an input to the detection region 151 with two or more fingers is termed a multi-touch, and a command such as magnifying or rotating a screen is performed according to an executed application program or a mobile application (hereinafter, referred to as an "application program").

Figure 2:
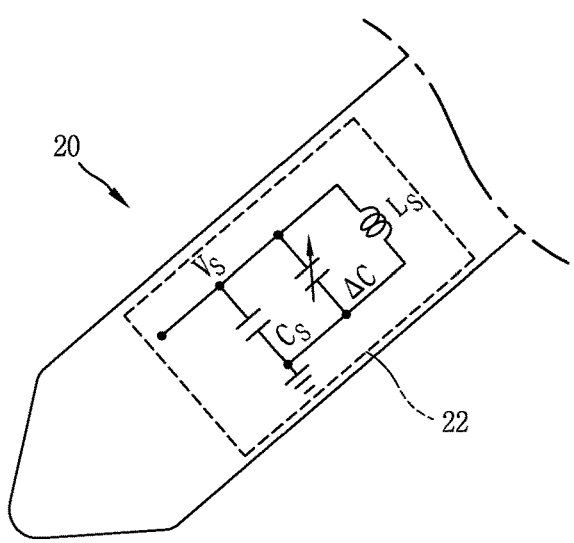
FIG. 2 is a conceptual view illustrating an LC resonance circuit provided within a stylus pen according to an embodiment of the present disclosure.

FIG. 2 is a conceptual view illustrating an LC resonance circuit provided within a stylus pen according to an embodiment of the present disclosure.

In an embodiment of the present disclosure, a circuit provided in the stylus pen includes an LC resonant circuit (or an LC circuit 22) including a coil L element Ls and a capacitor C element (ΔC and CS) without using a power consumption element such as a transistor or a diode. Also, the circuit includes a variable capacitance capacitor ΔC having a capacitance changing according to force applied to the pen.

Since the LC resonant circuit basically does not consume power, there is need to provide a separate power source for driving the circuit within the stylus pen.

In order to start a resonant operation of the LC resonant circuit of the stylus pen, a start signal of the resonant operation is required to be provided. Providing the start signal provides an initial condition for resonance. In detail, an AC voltage is applied to the LC resonant circuit from the outside (touch pane), and an AC current which is 90 degree out of phase is supplied. In this case, resonance of the LCD resonant circuit starts, but, since it is not energy injection, resonance rapidly enters a stabilization state. That is, resonance occurs in the LC circuit provided in the stylus pen by an electrical signal transmitted from the touch panel. Here, injection power is called reactive power, which does not contribute to energy consumption in actuality.

In detail, in a case in which a frequency of AC power and an LC resonance frequency are not completely the same, a mixture of vibration having an LC resonance frequency component and vibration having a frequency component of AC power occurs in the LC resonant circuit of the stylus pen.

The LC resonance itself does not consume power, and thus, even though AC power supply is stopped, the LC circuit continues to perform LC resonance. However, in actuality, since L has a resistance component, energy consumption is made in the resistance and heat is emitted. Thus, an amplitude of LC resonance is gradually attenuated according to the passage of time. Here, even though AC power is continuously supplied, attenuation of the LC resonance continues, and as a result, vibration of the LC resonance frequency component becomes zero. However, vibration having a frequency component of AC power is not attenuated but exists while AC power is continuously supplied.

When supply of AC power is stopped, the LC resonant circuit which has vibrated at a frequency of AC power is immediately stopped from vibrating at the AC power frequency and starts to vibrate at an LC resonance frequency.

In the present disclosure, inductive coupling is not used, capacitive coupling is made with capacitance present between the touch panel and the stylus pane, and an electrical signal is transmitted and received through the mutual capacitance (capacitance CM formed between the touch panel and the stylus pen by capacitive coupling).

Inductance LS of the element L or capacitance CS of the element C forming the LC resonant circuit installed in the stylus pen, or the both values, are increased or decreased according to pen pressure of a stylus pen head (or a pen tip). A variable capacitance condenser (or a variable capacitor) ΔC will be described as a partial component of the element C of the LC resonant circuit connected with the fixed capacitance CDS in parallel as illustrated in FIG. 2.

The capacitance ΔC of the variable capacitor has different values according to pen pressure. Thus, an LC resonance frequency has a different value accordingly. That is, a first electrical signal applied from the stylus pen to the touch panel before pen pressure is applied is converted into a second electrical signal according to the electric capacity ΔC, and pen pressure is detected on the basis of the second electrical signal. In other words, the principle of detecting pen pressure is detecting a frequency of a resonance signal generated by the LC resonant circuit installed in the stylus pen (specifically, a frequency of the converted resonant signal).

Here, detecting pen pressure may refer to determining a touched point in the touch panel. In the present disclosure, pen pressure may be detected to sense a touch applied by the stylus pen, and a touched point may be determined.

Thus, a start signal causing a resonance operation to be started needs to be transmitted to the LC resonant circuit of the stylus pen sensing pressure. In detail, as mentioned above, it is required to provide resonance driving AC power to the LC resonant circuit of the stylus pen.

A pen signal detecting device for transmitting power to the stylus pen and receiving a signal transmitted from the pen as illustrated in FIG. 2 will be described with reference to FIGS. 2 through 7.

Figure 3:
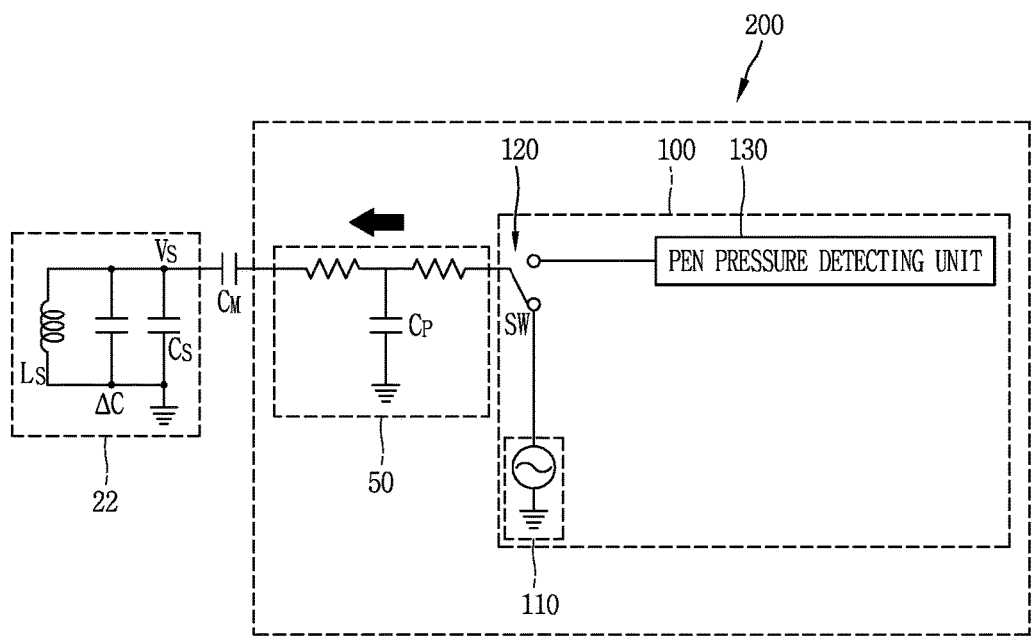
FIG. 3 is a conceptual view illustrating a configuration in which a pen signal detecting device according to an embodiment of the present disclosure transmits an electrical signal to the stylus pen.
Figure 4:
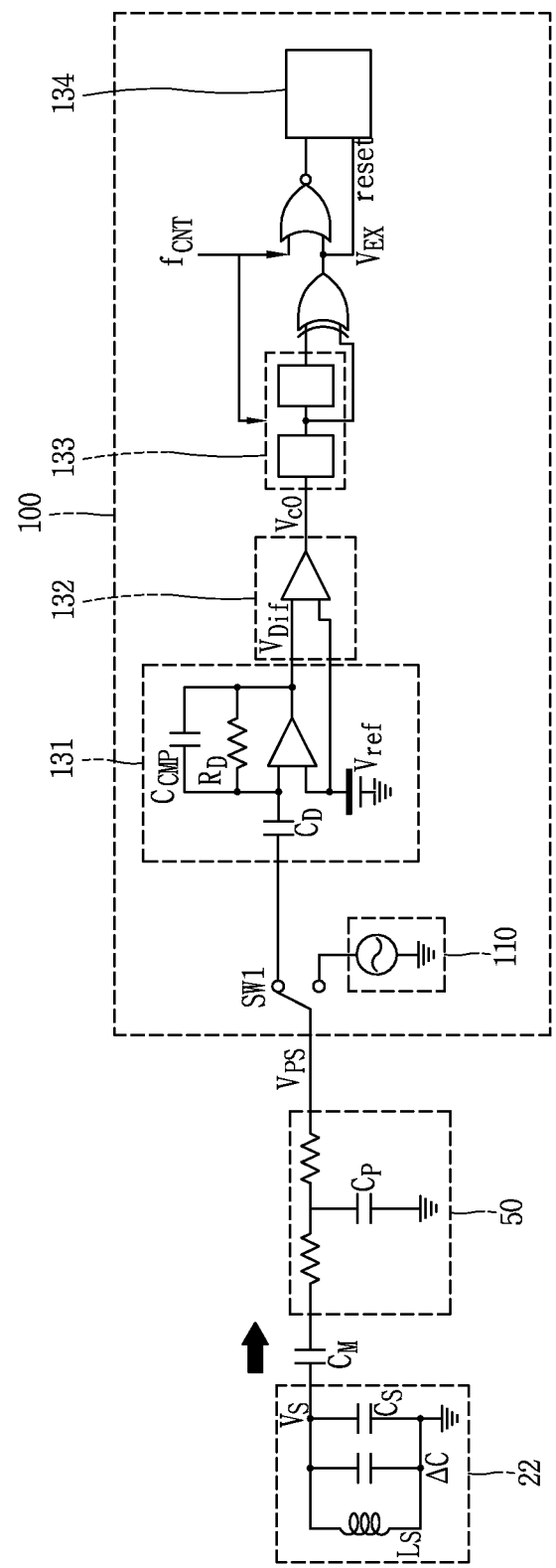
FIG. 4 is a conceptual view illustrating a configuration in which a pen signal detecting device according to an embodiment of the present disclosure detects pen pressure using an electrical signal transmitted from a stylus pen.

FIG. 3 is a conceptual view illustrating a configuration in which a pen signal detecting device according to an embodiment of the present disclosure transmits an electrical signal to the stylus pen, and FIG. 4 is a conceptual view illustrating a configuration in which a pen signal detecting device according to an embodiment of the present disclosure detects pen pressure using an electrical signal transmitted from a stylus pen.

First, referring to FIG. 3, the mobile terminal 10 according to an embodiment of the present disclosure may include a touch panel 200 and the stylus pen 20 including the LC circuit 22 (or a pen circuit unit 22). The touch panel 200 may include a plurality of touch panel electrodes 50 and a pen signal detecting device 100 receiving a signal transmitted from the pen circuit unit 22. In detail, the pen signal detecting device 100 supplies electric power to the pen circuit unit 22 of the stylus pen 20 in which an LC resonant circuit including a variable capacitor ΔC is installed, receives a signal transmitted from the pen circuit unit 22, and is connected to a touch panel electrode 50.

(The operation related to the pen signal detecting device 100 may be understood as being controlled by the control unit 180 of the mobile terminal described hereinafter. That is, the contents related to the pen signal detecting device 100 may be inferred and applied in the same or similar manner as being performed by the control unit 180).

Here, as described above, the touch panel electrode 50 may be the driving line (or a driving electrode) or a sensing line (or a sensing electrode) of the touch panel 200, and if necessary, the pen signal detecting device 100 may be connected to each of the driving line and the sensing line of the touch panel 200. That is, an AC signal generating unit 110 for transmitting a resonance excitation AC signal to the pen 20 may be configured at a circuit side for supplying a voltage to the driving electrode Tx of the touch panel 200. Also, a pen pressure detecting unit 130 for receiving a signal transmitted from a pen may be configured at a circuit side for detecting a signal from the sensing electrode Rx of the touch panel 200. This will be described in detail with reference to FIG. 7.

Meanwhile, in an embodiment of the present disclosure, a signal detecting device for detecting pen pressure from a signal transmitted from a pen may be connected to at least one electrode line (hereinafter, referred to as a "touch panel electrode") among the driving electrode TX and the sensing electrode RX for detecting a touch position in a capacitive manner in the touch panel 200. That is, in an embodiment of the present disclosure, electric power (electrical signal) may be transmitted and an electrical signal transmitted from the pen may be received by using at least one electrode line among the driving electrode or the sensing electrode provided in the touch panel 200.

In an embodiment of the present disclosure, since an electrical signal is transmitted and received through capacitive coupling, it makes no matter even though resistance of a signal transmission line is high. Thus, in an embodiment of the present disclosure, since there is no need to separately install a signal return path, there is no need to configure the signal transmission line as a coil. That is, in an embodiment of the present disclosure, an electrical signal may be transmitted and received through capacitive coupling using at least one of the driving electrode Tx and the sensing electrode Rx forming the touch panel 200.

The pen signal detecting device 100 of the embodiment is connected to the touch panel electrode 50 for detecting a touch position of a user's finger, a pen, and the like, in a capacitive manner. Also, the pen signal detecting device 100 includes the AC signal generating unit 110 for supplying resonance excitation AC signal to the pen circuit unit 22 by way of the touch panel electrode 50 and a pen pressure detecting unit 130 for detecting a resonance frequency from a signal transmitted from the pen circuit unit 22. The pen signal detecting device 100 includes a switching unit SW 120 selectively connecting the touch panel electrode 50 to the AC signal generating unit 110 or the pen pressure detecting unit 130.

According to switching of the switching unit 120, the pen signal detecting device 100 serves as an AC power source for supplying the resonance excitation AC signal to the pen circuit unit 22 or serves as a pen pressure detecting unit for detecting pen pressure of the stylus pen by analyzing a signal transmitted from the pen circuit unit 22 to sense a resonance frequency.

The AC signal generating unit 110 or the pen pressure detecting unit 130 is selectively connected to the touch panel electrode 50 according to a switching operation of the switching unit 120, and hereinafter, a switching time point or a switching time of the switching unit 120 will be described. For example, if a time required for the touch panel electrode 50 to scan 1 frame to detect a position of the user's finger or the stylus pen in a capacitive manner is ⅟₆₀ seconds, the switching unit 120 performs switching such that the resonance excitation AC signal generating unit 110 is connected to the touch panel electrode 50 during a partial amount of time (for example, about 200 μs) not used for scanning 1 frame of the time of ⅟₆₀ seconds. Time for detecting a touch position in a capacitive manner by scanning the touch panel electrode 50 may be different according to products and manufacturers, and for example, if about ⅟₆₀ seconds is a time given to scan 1 frame, a portion of ⅟₆₀ seconds is used to scan 1 frame in actuality, and thus, a time (for example, about 200 μs) for the touch panel electrode 50 to be connected to the AC signal generating unit 110 may be a region in which frame scanning is not performed for capacitive position detection within the time of ⅟₆₀ seconds.

Although not shown, in order to supply a voltage for line scanning to the touch panel electrode 50 and detect a touch position of the finger or the pen, an electrostatic sensor unit (power supply circuit and signal detecting circuit) for receiving an output signal from the touch panel electrode 50 and detecting a touch position in a capacitive manner is provided. Also, in an embodiment of the present disclosure, even though the AC signal generating unit 110 and the pen pressure detecting unit 130 are configured as a single hardware/circuit in the pen signal detecting device, but in an actual embodiment, the AC signal generating unit 110 may be provided within a voltage supply circuit of the touch panel 200 and the pen pressure detecting unit 130 may be provided within a signal detecting circuit of the touch panel 200, and in this case, the AC signal generating unit 110 may be connected to the Tx line and the pen pressure detecting unit 130 may be connected to the Rx line. However, this configuration is merely an embodiment and various configurations may be obtained from the present disclosure.

In the present embodiment, in addition to the existing operation for detecting a touch position, the resonance excitation AC signal may be transmitted to the touch panel electrode 50 through the switching unit 120 or a signal transmitted from the pen may be transmitted to the pen pressure detecting unit 130 for detecting a frequency by way of the touch panel electrode 50.

First, referring to FIG. 3, a case in which the resonance excitation AC signal generated by the AC signal generating unit 110 of the pen signal detecting device 100, that is, a start signal of resonance driving, is transmitted to the touch panel electrode 50 will be described.

The AC signal generating unit 110 included in the pen signal detecting device 100 is connected to the touch panel electrode 50 according to a switching operation of the switching unit 120, an AC signal generated by the AC signal generating unit 110 is transmitted to the touch panel electrode 50, and the resonance excitation AC signal as a resonance driving signal is transmitted as AC power to the LC resonant circuit (pen circuit unit of the stylus pen) through mutual capacitance CM with the stylus pen.

As mentioned above, the touch panel used in the present disclosure is a mutual capacitance type touch panel, and an electrode line used in touch position detection is used together to detect pen pressure of the stylus pen.

Also, the resonance excitation AC signal for driving resonance is transmitted to the LC resonant circuit 22 (pen circuit unit) of the stylus pen according to capacitive coupling, and thus, a current rarely flows. Thus, the mutual capacitance type touch panel may be shared. More accurately, in order to transmit power (energy) from the touch panel as a host to the stylus pen, the AC signal detecting unit 110 generates an AC signal to be supplied to the touch panel electrode 50.

When the resonance excitation AC signal (AC power) is transmitted from the touch panel electrode 50 as a host to the stylus pen through capacitive coupling, the LC resonance circuit of the stylus pen receives the supplied AC power and immediately starts LC vibration. Here, an vibration frequency at which the LC resonant circuit of the pen circuit unit vibrates is expressed by Equation 1 below.

$$f_{LC} = \frac{1}{2\pi\sqrt{L_S(C_S + \Delta C)}} \quad \text{[Equation 1]}$$

Here, LS, CS, and ΔC are inductance of the element L, capacitance of fixed capacity forming the element C, and capacitance of variable capacity forming the element C, respectively. As mentioned above, ΔC is capacitance varied according to force (pen pressure) when the user presses the stylus pen to the touch panel, and a resonance frequency is changed according to the changed capacitance. In order to check a value (or change) of the resonance frequency, the pen pressure detecting unit 130 is provided in the pen signal detecting device 100 of the touch panel 200 according to the present embodiment.

When the resonance frequency of the LC resonance signal is the same as a frequency of the resonance excitation AC signal for resonance driving, an amplitude of the LC resonance signal is substantially identical to that of the resonance excitation AC signal. However, if the resonance frequency of the LC resonance signal is significantly different from that of the resonance excitation AC signal, the amplitude of the LC resonance signal is reduced. However, when the difference in the frequency is within a range from −10% to +10%, the amplitude of the LC resonance signal is not rapidly reduced.

In order to accurately detect a resonance frequency of the LC resonant circuit and in order for the amplitude of the LC resonance signal not to be reduced to be smaller than a predetermined value (for example, 50%) compared with the amplitude of the transmitted resonance excitation AC signal, capacitance of ΔC may be set such that a different in the frequency is within a range from −10% to +10%, whereby sufficient strength of a signal for detecting pen pressure of the stylus pen described hereinafter may be obtained.

As described hereinafter, a differentiator 131 and a comparator 132 may be used as circuits for detecting a resonance frequency of the pen circuit unit (LC resonant circuit) of the pen.

An AC signal generated by the AC signal generating unit 110 may be expressed by Equation 2 below.

$$V_a = V_{a1} \sin 2\pi f t \quad \text{[Equation 2]}$$

When Equation 2 is differentiated, Equation 3 below is obtained.

$$\frac{dV_a}{dt} = 2\pi f V_{a1} \cos 2\pi f t \quad \text{[Equation 3]}$$

As a result, it can be seen that an amplitude of a differential wave is in proportion to a frequency, and when the differentiator receives the LC resonance signal, an amplitude voltage of the differentiated wave differentiated by the differentiator is in proportion to the frequency.

When a difference between the resonance frequency of the LC resonance signal and the frequency of the resonance excitation AC signal for resonance driving exceeds ±10%, the amplitude of the LC resonance signal is reduced to about 50%. IN this case, when the signal is input to the differentiator, the amplitude voltage of the differentiated wave is 45% of ×0.9. Meanwhile, the difference in frequency is within ±10% so the amplitude of the LC resonance signal is reduced to be about 50%, it is 55% of ×1.1 in the differentiator.

A process of transmitting a resonance excitation AC signal to the LC resonant circuit of the stylus pen from the AC signal generating unit 110 will be described with reference to FIG. 3.

An AC signal is transmitted to the touch panel electrode 50 for a set transmission time (for example, about 200 μs) until the amplitude of the LC resonance signal has a sufficient size. While the resonance excitation AC signal is continuously supplied to the LC resonant circuit of the pen, the LC resonant circuit vibrates in a state in which vibration of the LC resonance frequency (vibration of a first frequency component) of the LC resonance frequency and vibration having a frequency component of the resonance excitation AC signal (vibration of a second frequency component) are mixed. Thus, an amplitude of an vibration signal of the LC resonant circuit is an amplitude of vibration in which the first frequency component and the second frequency component are mixed.

When providing of the resonance excitation AC signal to the LC resonant circuit of the pen is stopped, vibration having the frequency component of the resonance excitation AC signal disappears and vibration of the LC resonance frequency starts, and an amplitude of the vibration at this time has the amplitude of the vibration in which the vibrations of the two frequency components are mixed, as is. That is, even though transmission of the resonance excitation AC signal to the LC resonant circuit is stopped, the amplitude of vibration of the LC resonant circuit is not naturally reduced.

Meanwhile, providing the resonance excitation AC signal from the AC signal generating unit 110 to the touch panel electrode 50 for a predetermined period of time in which the touch panel electrode 50 and the AC signal generating unit 110 are connected, that is, during the set transmission time, is a meaningful operation.

That is, the resonance excitation AC signal may be transmitted from the AC signal generating unit 110 to the stylus pen through the touch panel electrode 50 only for a short period of time (a few thousands of μs), but here, in order to have noise resistance in VO described hereinafter (that is, in order to increase an SNR of VO), it is required to supply the resonance excitation AC signal to the pen during a predetermined period of time (set transmission time).

Since stray capacitance is present in the touch panel electrode 50, when the resonance excitation AC signal is interrupted, a potential VDC1 immediately before the interruption is maintained s a DC potential of the CP. For reference, when the touch panel electrode 50 is connected to the pen pressure detecting unit 130 according to a switching operation of the switching unit 120, an AC component of a VPS voltage (that is, pen pressure detection voltage) is transmitted to the pen pressure detecting unit 130, but here, in order to indicate a DC component present together with the AC component of the pen pressure detection voltage VPS transmitted from the touch panel electrode 50, the DC component is indicated as VDC1.

In a state in which the potential VDC1 is maintained, an LC resonance signal VS of the LC resonant circuit of the pen is transmitted to the touch panel electrode 50 through CM. Here, transmitted is the AC component of the LC resonance signal, and since the stray capacitance CP is present, the AC signal $V_O$ transmitted to the touch panel electrode 50 may be expressed by Equation 4 below.

$$V_O \cong \frac{C_M}{C_P + C_M} V_S \quad \text{[Equation 4]}$$

Also, when power transmitted from the AC signal generating unit 110 is cut off, VDC1 overlaps $V_O$, and thus, the electrical signal VPS observed in the touch panel electrode 50 is actually expressed by Equation 5 below.

$$V_{PS} = V_{DC1} + V_O \cong V_{DC1} + \frac{C_M}{C_P + C_M} V_S \quad \text{[Equation 5]}$$

Figure 5:
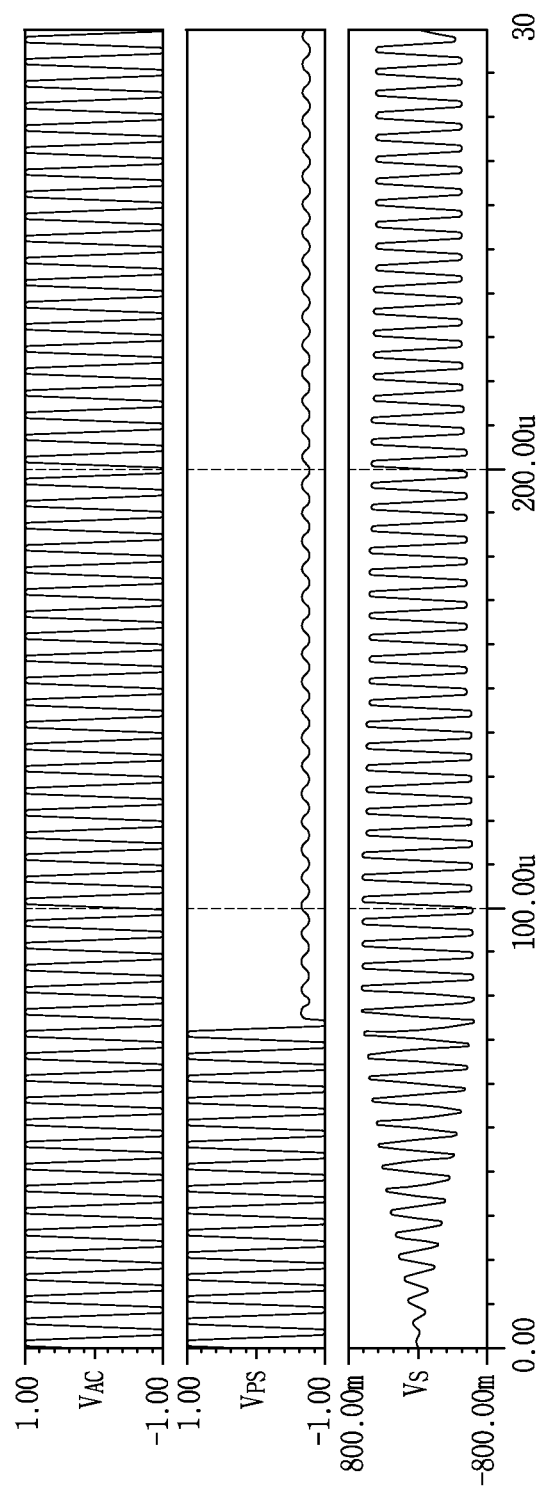
FIG. 5 is a conceptual view illustrating an electrical signal $V_{PS}$ observed according to a change in time in a touch panel electrode.

FIG. 5 illustrates an electrical signal $V_{PS}$ observed according to a change in time in the touch panel electrode. After transmitting the resonance excitation AC signal to the touch panel electrode 50 for a preset transmission time, the switching unit 120 disconnects the AC signal generating unit 110 and connects the touch panel electrode 50 to the pen pressure detecting unit 130. As the pen pressure detecting unit 130 is connected to the touch panel electrode 50, pen pressure of the pen is detected, whereby an operation of performing a resonance frequency of the LC resonant circuit of the pen is performed.

A detailed configuration of the pen pressure detecting unit 130 according to the present disclosure is illustrated in FIG. 4.

Referring to FIG. 4, the pen signal detecting device 100 is connected to the touch panel electrode 50 for detecting a touch position in a capacitive manner, and supplies an AC signal to the touch panel electrode 50 or receives a signal transmitted through the touch panel electrode 50, and such a selective operation is performed by the switching unit 120.

A signal including an LC resonance frequency of the pen is transmitted to the pen pressure detecting unit 130 by way of the mutual capacitance CM and the touch panel electrode 50.

The pen pressure detecting unit 130 serves to detect a degree of pen pressure of the pen by measuring a frequency included in the received signal, and to this end, the pen pressure detecting unit 130 includes a differentiator 131 and a comparator 132. The pen pressure detecting unit 130 may further include a sampling shifter 133 delaying a signal and an EXOR counter 134 for counting a value of a corresponding frequency from the delayed signal. However, since the shifter 133 and the counter 134 may calculate a value of a frequency by software, the shifter 133 and the counter 134 may be replaced by other components.

As illustrated in FIG. 4, the pen pressure detection voltage VPS input from the touch panel electrode 50 to the pen pressure detecting unit 130 is input to the differentiator 131 of the pen pressure detecting unit 130. An output signal VDif of the differentiator 131 may be expressed by Equation 6 below.

$$V_{Dif} = -R_D C_D \frac{dV_{PS}}{dt} \cong -R_D C_D \frac{C_M}{C_P + C_M} \frac{dV_S}{dt} \quad \text{[Equation 6]}$$

That is, as described above, an influence of a DC component disappears by the differentiator 131, and since the LC resonance signal has a sine wave having a single frequency, even though it is differentiated, a signal period is preserved. The output signal VDif of the differentiator 131 may be a pen pressure detection voltage from which the DC component has been removed. Meanwhile, in FIG. 6, a voltage VS of the stylus pen circuit unit, the pen pressure detection voltage VPS transmitted from the touch panel electrode 50 to the pen pressure detecting unit 130, the output voltage VCO of the comparator 132, a voltage VEX input to the counter 134, and a result of counting a frequency by the counter 134 are illustrated.

The pen pressure detection voltage from which a DC component has been removed by the differentiator 131, that is, VDif, is input to the comparator 132. When a comparison reference level of the comparator 132 is set to an AC ground, an output of the comparator 132 is a zero cross detection digital signal which is changed to 1 or 0 in every half period of Vs.

In order for the digital counter 134 to calculate the period of the output of the comparator 132, a switching edge of an output signal is synchronized with a fCNT sampling clock. To this end, the shifter 133 for shifting a signal in synchronization with the fCNT sampling clock may be used.

Here, as the shifter 133, a 2-stage speed-change shifter is used, a sampling signal and a 1 sample period-delayed signal are obtained, and a frequency of a sampling clock is dependent upon the number of stages of pen pressure to be detected. For example, in a case in which pen pressure is intended to be detected by 20 stages, sampling is performed at a sampling clock signal (fCNT=10 MHz) of a frequency of 100 times of a resonance excitation AC signal frequency (for example, 100 KHz). This is because, since the LC resonance frequency (VS frequency) is set to be within a range of −10% to +10% of the resonance excitation AC signal frequency, when a difference in frequency is known by resolution of 1%, a different in frequency of the stages of −10 to +10% may be distinguished. That is, pen pressure of 20 stages (accurately, 21 stages) may be detected.

When EXOR logic of two output signals of the shifter 133 is taken, it is possible to detect 0 and 1 change edge of an output of the comparator 132. That is, an output of an EXOR logic gate becomes a signal that only a period of 1 sampling clock is "1" in every half period of an LC resonance signal coming from the stylus pen.

In a case in which fCNT is provided to any one input terminal of an NOR gate and an output of an EXOR gate is transmitted to the other input terminal of the NOR gate, when an output of the EXOR gate is 0, the NOR gate continuously maintains a fCNT pulse as a T (true) value. Thus, when the number of pulses of the output of the EXOR gate is counted by a counter, the number of pulses obtained by subtracting only 1 pulse from a sampling pulse corresponding to a half period of the resonance excitation AC signal may be known, and a time of a half period of an LC resonance signal may be calculated therefrom. As a result, it is possible to detect pressure of a head of the stylus pen, that is, pen pressure. That is, the shifter 133 has two stages, and one of them outputs a signal synchronized with a clock and the other outputs 1 clock-delayed signal, whereby a timing at which an input signal is changed from 0 to 1, or, conversely, from 1 to 0 may be detected.

A time taken for the sequential pen pressure detection process is very short. For example, pen pressure may be detected during a period of a vertical synchronization signal (V-Sync) of a screen, and a touch position and pen pressure may be continuously detected during 1 frame display period.

Also, after the touch position of the stylus pen is detected, in order to detect pen pressure of the corresponding pen, the resonance excitation AC signal may be transmitted and only a portion of the touch panel electrode for receiving a pen pressure detection signal transmitted from the pen may be selected. That is, the resonance excitation AC signal may be selectively transmitted to two RX electrodes (or two TX electrodes) closest to the touch position obtained through touch position detection, and the selected RX electrodes (or TX electrodes) may be used as lines for receiving a pen pressure detection signal including the LC resonance signal.

When the resonance excitation AC signal is supplied to the pen circuit unit (LC resonance circuit), the stylus pen always transmits the LC resonance signal back to the touch panel electrode, and thus, whether a touched object is a finger or the pen having the LC resonant circuit may be checked by the components for detecting pen pressure of the present embodiment.

Meanwhile, another embodiment of the configuration of the pen signal detecting device of the present disclosure illustrated in FIG. 4 will be described.

For example, in the case of a touch panel, coupling noise is present between the LCD device and the touch panel electrodes disposed therebelow. In this case, substantially the same noise is generated in an adjacent electrode line, which is called common mode noise (or stray capacitance). Such noise is removed as it passes through the differentiator, and when a reference level is provided to the differentiator by way of the touch panel electrode, the differentiator differentially outputs a difference between two input signals, and thus, the common mode noise may be removed by a difference between the two input signals.

Figure 6:
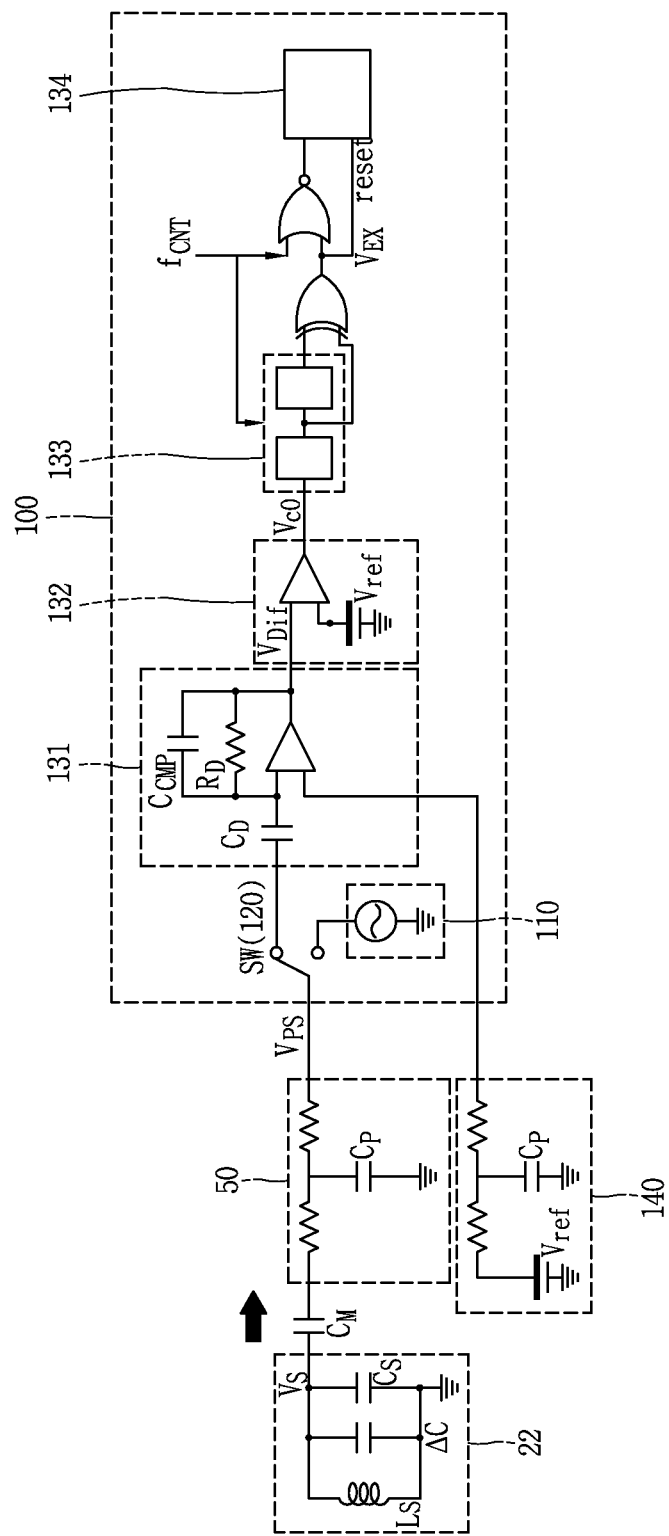
FIGS. 6 and 7 are conceptual views illustrating a pen signal detecting device according to another embodiment of the present disclosure.

A circuit configuration for removing the common mode noise is illustrated in FIG. 6. FIG. 6 is a conceptual view illustrating a pen signal detecting device according to another embodiment of the present disclosure.

In the pen signal detecting device illustrated in FIG. 6, the pen pressure detecting unit 130 transmitting an AC signal using the touch panel electrode 50 and detecting pen pressure upon receiving a resonance signal from the pen transmitted through the touch panel electrode 50 is the same as that of the case illustrated in FIG. 4, and in order to remove noise, that is, stray capacitance, generated by the coupling between the touch panel and other component (LCD device), the pen signal detecting device further includes a stray capacitance providing unit 140 connected to one of input terminals of the differentiator 131.

Capacitance CP of the stray capacitance providing unit 140 has the same value as a value CP of stray capacitance formed in the touch panel, and when a resonance signal of the pen transmitted through the touch panel electrode 50 is input to a first input terminal of the differentiator 131 and a signal having the same capacitance is provided to a second input terminal of the differentiator 131 through the stray capacitance providing unit 140, noise formed in the touch panel may be removed.

Figure 7:
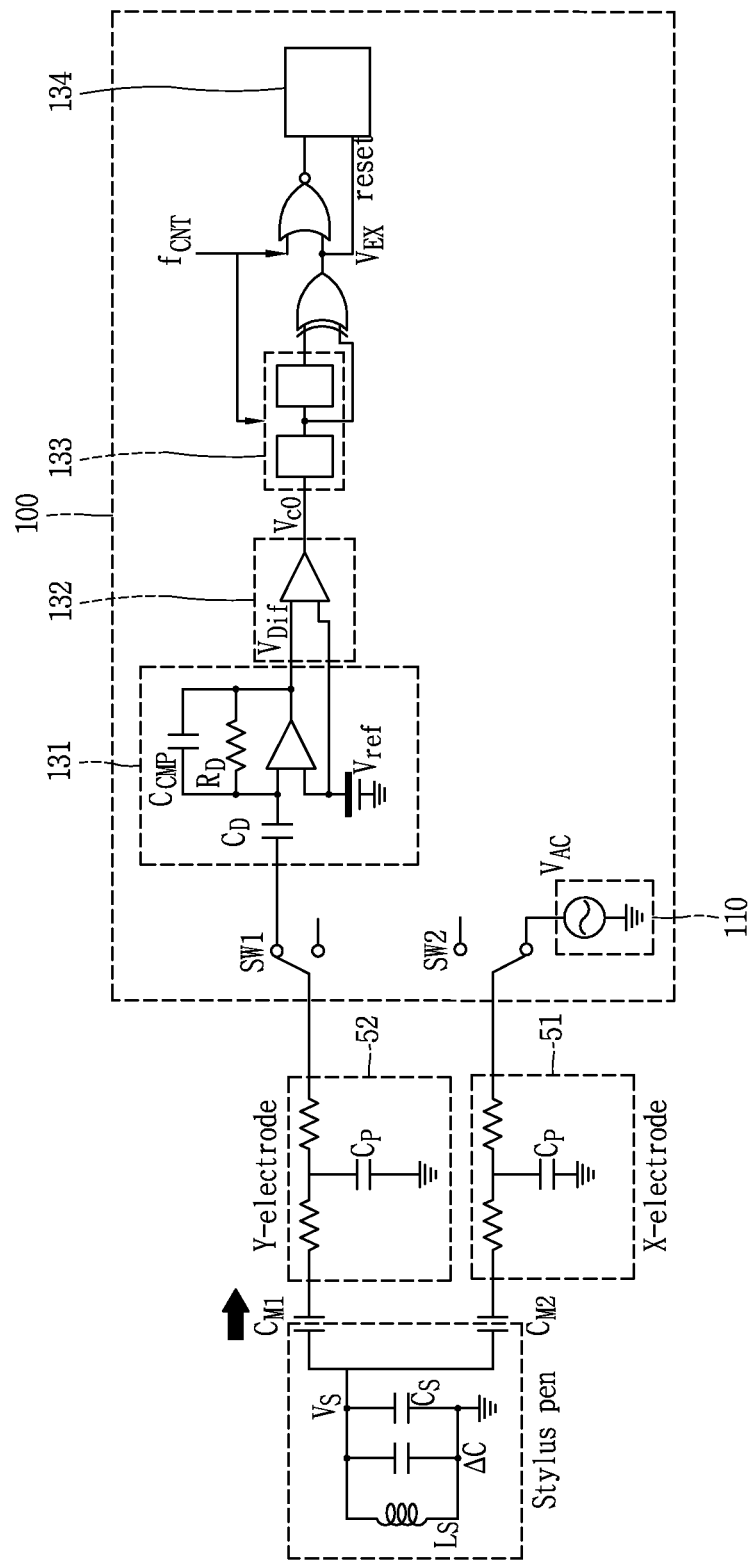

FIG. 7 is a conceptual view illustrating a pen signal detecting device according to another embodiment of the present disclosure.

In the case of the embodiments illustrated in FIGS. 4 and 6, the case in which the electrode line of the touch panel transmitting the resonance excitation AC signal and the electrode line of the touch panel for transmitting the resonance signal (pen pressure signal) of the pen output from the stylus pen to the pen pressure detecting unit 130 for detecting it are the same has been described.

The touch panel used in the present disclosure is a mutual capacitance type touch panel, and the electrode line used for detecting a touch position is also used to detect a stylus pen pressure signal as is, as described above.

In order to detect a touch position, the electrode lines are disposed in an X direction (for example, Tx) and Y direction (for example, Rx) in the touch panel, and thus, in the present disclosure, it may also be configured such that the electrode line disposed in the X direction is used as an electrode line for supplying the resonance excitation AC signal and the electrode line disposed in the Y direction is used as an electrode line for transmitting the pen pressure signal (LC resonance signal) from the stylus pen to the pen pressure detecting unit 130.

Mutual capacitance CM1 is present between a head portion of the stylus pen and the electrode line disposed in the X direction, and mutual capacitance CM2 is present between the head portion of the stylus pen and the electrode line disposed in the Y direction. Thus, according to the same mutual capacitive coupling, the resonance excitation AC signal may be transmitted from the electrode line disposed in the X direction to the stylus pen and a pen pressure signal may also be transmitted to the pen pressure detecting unit 130 by the medium of the electrode line disposed in the Y direction.

In detail, referring to FIG. 7, among electrode lines forming the touch panel, the AC signal generating unit 110 is connected to the electrode line disposed in the X direction, for example, the driving electrode Tx 51, and the pen pressure detecting unit 130 is connected to the electrode line disposed in the Y direction, for example, the sensing electrode Rx 52.

Also, first and second switches SW1 and SW2 may be provided to selectively connect the AC signal generating unit 110 and the pen pressure detecting unit 130 to the driving electrode 51 and the sensing electrode 52 of the touch panel, respectively. According to operations of the first and second switches SW1 and SW2, the AC signal generating unit 110 is connected to or disconnected from the driving electrode 51, and the pen pressure detecting unit 130 including a differentiator and a comparator is selectively connected to the sensing electrode 52. Thus, in the embodiment illustrated in FIG. 7, in actuality, the AC signal generating unit 110 may be provided within a voltage supply circuit for supplying a voltage to the driving electrode 51 to determine a touch position and the pen pressure detecting unit 130 may be configured within a signal detection circuit for determining a touch position upon receiving a signal transmitted from the sensing electrode 52.

According to the embodiments of the present disclosure as described above, electrodes of the existing touch panel may be used, and since the resonance excitation AC signal is easily transmitted to the pen, there is no need to separately configure a power supply unit within the stylus pen. Also, since pen pressure is detected using a pen pressure signal (LC resonance signal) transmitted from the pen, pen pressure may be more accurately measured.

Hereinafter, a method of detecting a touch position (spot) applied by the stylus pen 20 on the basis of the touch panel 200 will be described in detail with reference to the accompanying drawings.

Figure 8:
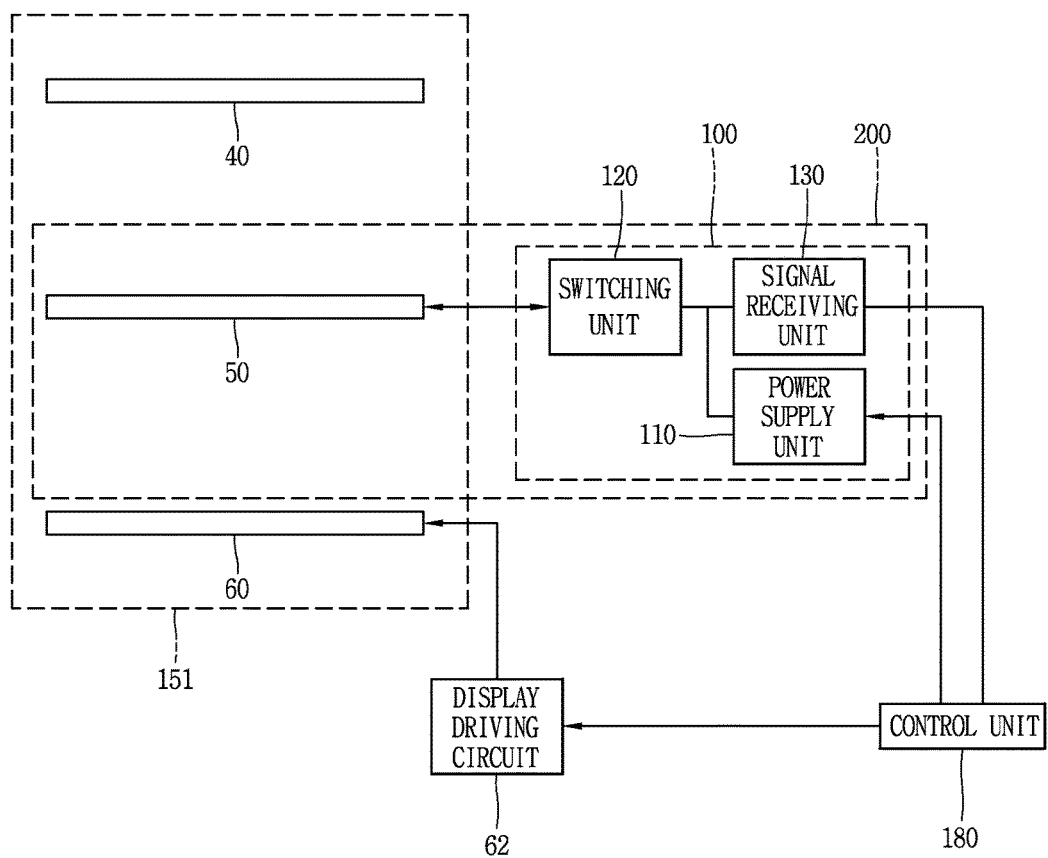
FIG. 8 is a conceptual view illustrating a display unit including a touch panel according to an embodiment of the present disclosure.

FIG. 8 is a conceptual view illustrating a display unit including a touch panel according to an embodiment of the present disclosure.

As described above, the mobile terminal 100 according to an embodiment of the present disclosure supplies power to an external power reception side (stylus pen, or the like) by the touch panel 200. Also, the touch panel 200 serves to detect a contact position of the user's finger or the stylus pen in a capacitive manner. In an embodiment of the present disclosure, through the foregoing operation of the touch panel, a capacitor may transmit a voltage to a reception side including a capacitor through capacitive coupling.

Referring to FIG. 8, the mobile terminal of an embodiment includes a touch panel 200 recognizing a touch of a user's finger or a pen in an electrostatic manner, a display panel 60 displaying an image, and a control unit 180 detecting a position of a touch applied to the touch panel 200 and causing power to be supplied to the outside.

The touch panel 200 is a capacitive position detecting unit, and a protective cover 40 protecting the panel from a touch of the user or the pen may be further formed on the touch panel 200.

In detail, the touch panel 200 includes an electrostatic sensor unit 50 (a touch panel electrode, for example, a driving electrode Tx and a sensing electrode Rx), and a signal receiving unit processing an electrostatic signal, and in particular, the touch panel 200 includes a power supply unit 110 and a switching unit 120.

Here, referring to the contents described above with reference to FIGS. 3 through 7, a signal receiving unit 130 may be the pen pressure detecting unit 130, and the power supply unit 110 may be the AC signal generating unit 110. Also, the touch panel electrode 50 (the driving electrode Tx and the sensing electrode Rx) described above with reference to FIGS. 3 through 7 will be described as the electrostatic sensor unit 50.

The electrostatic sensor unit 50 includes an indium tin oxide (ITO) film and a sensor in a grid or matrix structure in which a plurality of transparent electrodes are disposed in a first direction and a second direction crossing the first direction, and detects a position of a touch applied by a finger or a pen in a detection region of a device such as a smartphone or a tablet PC. The signal receiving unit 130 serves to process an electrical signal obtained by the electrostatic sensor unit 50.

In the touch panel 200, in order to detect a touch position of a hand or a pen, a voltage is supplied from the power supply unit 110 to an electrode line of the touch panel 200 to scan a detection region, and a scanned electrical signal is processed by the signal receiving unit 130 to thereby detect a touch position of the user's finger or the pen.

In particular, in the present embodiment, in order to generate capacitive coupling to supply power to the outside, the power supply unit 110 includes a plurality of sources, and a switching unit 120 is further provided to select a voltage source connected to the electrostatic sensor unit 50 among a plurality of voltage sources forming the power supply unit 110.

Detection of a touch position through the electrostatic sensor unit 50, that is, through the touch panel 200 of the embodiment and a configuration of wireless power transmission through capacitive coupling will be described in detail with reference to the accompanying drawings.

Meanwhile, in the present embodiment, a touch position detection based on a capacitive scheme (electrostatic scheme) is disclosed, but a position of the finger or the pen may also be detected through other scheme than the electrostatic scheme. For example, various known schemes such as a resistive scheme, an optical scheme, and an ultrasonic scheme may be used to replace the touch panel 200.

The display panel 60 is positioned below the electrostatic sensor unit 50, and the display panel 60 may be various display devices such as an LCD, an OLED, and the like. Also, a display driving circuit 62 for transmitting a video signal to the display panel 60 may be provided and an image is displayed and a screen is driven by a touch under the control of the control unit 180.

Figure 9:
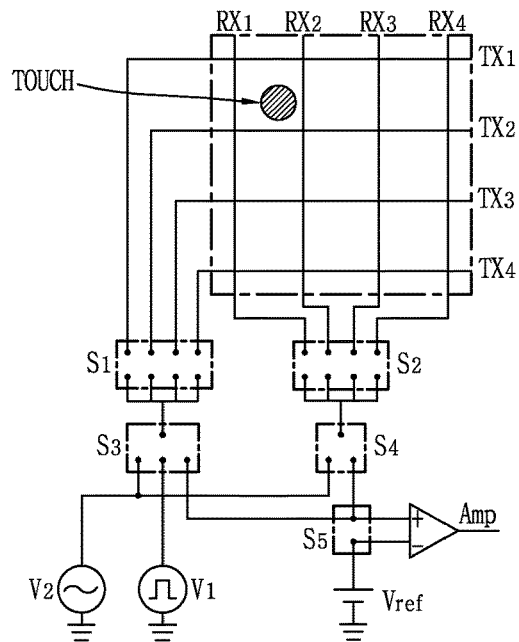
FIG. 9 is a conceptual view illustrating a configuration of a touch panel according to an embodiment of the present disclosure.

FIG. 9 is a conceptual view illustrating a configuration of a touch panel according to an embodiment of the present disclosure.

Figure 10:
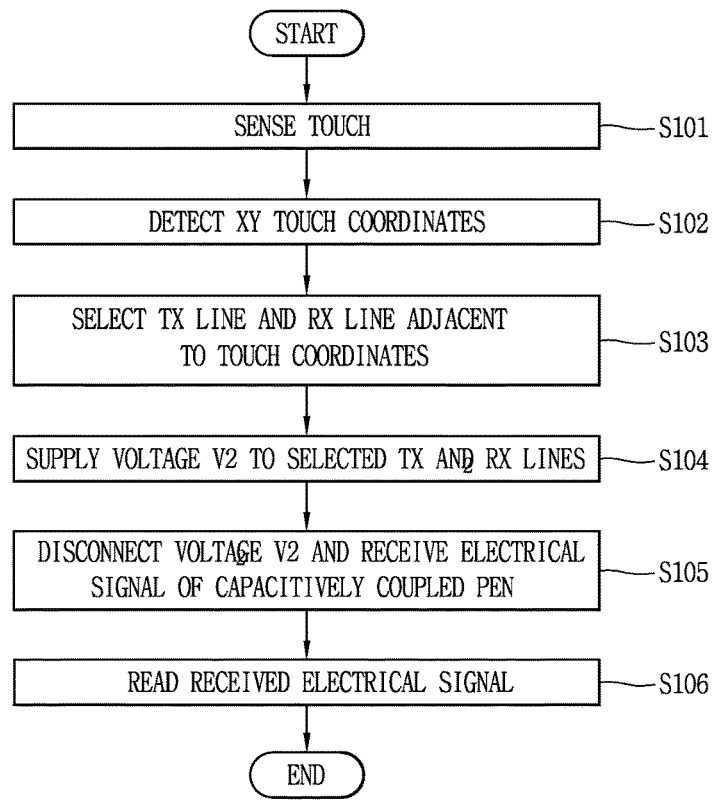
FIG. 10 is a flow chart illustrating a method of supplying an electrical signal through a touch panel according to a first embodiment of the present disclosure.

FIG. 10 is a flow chart illustrating a method of supplying an electrical signal through a touch panel according to a first embodiment of the present disclosure.

First, in FIG. 9, it is illustrated that four electrode lines are installed in vertical and horizontal directions on the touch panel, respectively, in order to simplify the drawing.

A plurality of driving electrodes TX and a plurality of sensing electrodes RX disposed in a grid or matrix form are provided in the touch panel, and in FIG. 9, the driving electrodes TX and the sensing electrodes RX are disposed in horizontal and vertical directions.

Hereinafter, the electrode lines forming the driving electrode Tx will be referred to as Tx lines and the electrode lines forming the sensing electrodes Rx will be referred to as Rx lines.

The electrode lines RX1 to RX4 and TX1 to TX4 disposed vertically and horizontally are connected to a first switch S1 and a second switch S2. The first switch S1 is connected to a third switch S3 connected to a plurality of voltage sources V1 and V2, and the second switch S2 is connected to a fourth switch S4 connected to the signal receiving unit 130. The fourth switch S4 selectively connects the Rx lines of the touch panel to an input terminal of an analog amplifier or connects the Rx lines to the second voltage source V2 generating an AC voltage.

A fifth switch S5 is further provided to selectively apply Vref power to all the input terminals of the analog amplifier to stabilize an operation of the analog amplifier.

Here, the first switch S1 and the second switch S2 are address decoders and serve to turn on and turn off a switch according to a combination of XY addresses. For example, one switch is selected for one address of the X electrode lines, but in the present disclosure, two switches select a decoder. This will be described in detail hereinafter.

Meanwhile, the third to fifth switches S3 to S5 are switches for connecting one line by a signal generated by the control unit 180. That is, the third switch S3 selectively switches the TX lines of the touch panel such that the TX lines are connected to the first voltage source V1, the second voltage source V2, or an input terminal of an analog amplifier. That is, by the third switch S3, the Tx electrode lines of the touch panel are connected to the first voltage source V1 for providing a voltage to the Tx lines, as a surface wave, for recognizing touch coordinates, connected to the second voltage source V2 for providing an AC voltage to the Tx and Rx lines to generate capacitive coupling between the touch panel and the stylus pen, or connected to an input terminal of an analog amplifier as one component of the signal receiving unit.

The fourth switch S4 may perform switching to selectively connect the RX lines of the touch panel to the input terminal of the analog amplifier or to the second voltage source V2.

The first voltage source V1 is a TX line drive pulse generator, which corresponds to a Tx drive circuit in an existing touch panel. V1 of a first voltage source is applied to the Tx line to perform scanning, and a signal output from the Rx line is received by the input terminal of the analog amplifier to detect X and Y coordinates. This is the same as the touch sensing circuit as known.

Amp is an analog amplifier amplifying a touch signal voltage to read it, and it is the same as an analog amplifier provided in an existing touch panel.

In particular, as described above, the second voltage source V2 is power source used to transmit electric power to the stylus pen.

In FIG. 9, the stylus pen, whose touch position is detected in a capacitive manner, is not entirely illustrated but only a contact portion of the touch panel is illustrated as a circle. According to the present embodiment, the stylus pen receives electric power through capacitive coupling between the touch panel and the stylus pen, and in order to store the received electric power, the stylus pen includes an LC circuit.

That is, in FIG. 9, a circuit configuration generating capacitive coupling is illustrated, and a transmission side circuit 50 of the touch panel and a reception side circuit 22 of the stylus pen are included. Thus, electric power transmitted through capacitive coupling is stored in the LC circuit within the stylus pen. When the transmission side circuit of the touch panel is simply illustrated, the touch panel electrode includes RP and CP together with a voltage V2 of a power supply unit, and the RP and CP indicate a resistance component and a stray capacitive component of the transparent electrode lines (TX line and RX line) of the touch panel side, respectively. When electric energy vibrating at the same frequency as a resonance frequency of the LC circuit 22 is transmitted from the outside, the LC circuit 22 provided in the stylus pen 20 starts to vibrate. In a general case, electric energy may be consumed up, but in a resonant state, energy consumption is zero. That is, energy transmitted from the outside in a resonance state is confined between the LC of the stylus pen and comes and goes between L and C to continue the resonance state.

A method of supplying power to the stylus pen corresponding to a power receiving side in the touch panel will be described in detail with reference to FIG. 10. Also, an operation of a touch panel illustrated in FIGS. 11 through 13 will be described together with description of FIG. 10.

The stylus pen receiving electric power retains electric energy in a resonance state, and when power supply from the touch panel providing electric power is stopped, the maintained electric energy is transmitted again toward the touch panel. Here, the touch panel receives electric energy transmitted from the stylus pen as an electrical signal, and the touch panel and the control unit may analyze a frequency of the received electrical signal to detect pen pressure of the stylus pen (pressure applied to the pen by the user) (related contents are replaced with the contents described above with reference to FIGS. 3 through 7).

Operations of the first to fifth switches constituting the switching unit 120 are controlled by the control unit 180 according to a mode of the touch panel. For example, the first to fifth switches are controlled to connect the TX lines and the RX lines to be connected to different components in a capacitive detection mode of a touch position and an electric power transmission mode to the outside.

First, a touch is sensed through scanning of the TX line and the Rx line forming the electrostatic sensor unit of the touch panel according to an embodiment of the present disclosure (S101), and XR coordinates of the touched position are detected (S102).

Figure 11:
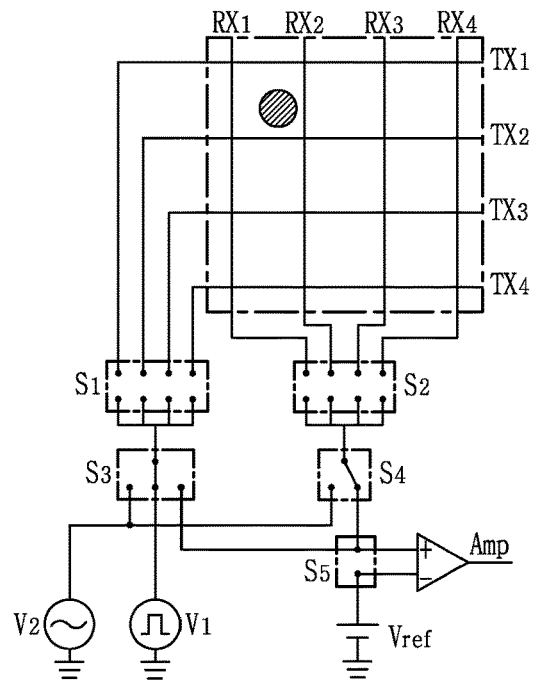
FIGS. 11 through 13 are conceptual views illustrating a configuration of a touch panel operated according to the first embodiment of the present disclosure.

In the process of recognizing the touch position, power is supplied through line scanning and an output signal is checked in the touch panel 200 like a general touch panel, and the switching unit operates as illustrated in FIG. 11.

That is, although not shown, the first switch S1 and the second switch S2 are sequentially connected under the control of the control unit 180, and the third switch S3 connects the TX line of the touch panel to the first voltage source V1 generating a pulse signal. The fourth switch S4 connects an RX signal selected by the second switch S2 corresponding to a decoder to one input terminal of the analog amplifier Amp. Briefly, the first voltage source as a pulse signal generator is connected to the Tx line through switching of the third switch S3, and the RX line is connected to the input terminal of the amplifier Amp trough switching of the fourth switch S4.

The fifth switch S5 connects a reference signal Vref to the other input terminal of the analog amplifier such that an output signal of the RX line is amplified by the analog amplifier Amp.

Connection between the TX line and the first voltage source, connection between the RX line and the input terminal of the analog amplifier, and connection of the reference signal to the other input terminal of the analog amplifier are the same as a configuration of a general touch position sensing circuit, and thus, a detailed description of an operation thereof will be omitted.

In this manner, a position of the hand or the pen touched on the touch panel may be detected in the capacitive manner according to switching of the switching unit. After XY coordinates of the touch position are detected, an operation of selecting a TX line and an RX line most adjacent to the touch coordinates is performed (S103).

That is, two TX lines and two RX lines closest to the corresponding touch position are selected according to the XY coordinate information of the detected touch position. In FIG. 3 or 5, TX1 and TX2 and RX1 and RX2 correspond to the electrode lines.

Thereafter, a process of supplying electric power to the selected four electrode lines, that is, TX1, TX2, RX1, and RX2 is performed (S104).

Figure 12:
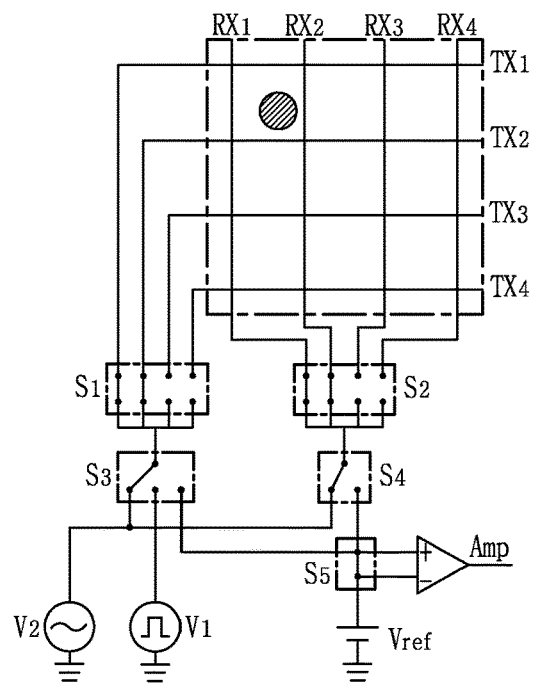

FIG. 12 illustrates a state of the switching unit when electric power is supplied to the two TX lines and the two RX lines.

First, the first switch S1 connects two TX lines selected as electric power supply lines to the third switch S3. The second switch S2 connects two RX lines selected as electric power supply lines to the fourth switch S4.

The third switch S3 connects two TX lines connected by the first switch S1 to the second voltage source V2 generating an AC voltage. The fourth switch S4 performs switching to connect the RX line of the touch panel to the second voltage source V2 such that an AC voltage transmitted from the second voltage source V2 is transmitted to the TX line through the third switch and also transmitted to the RX line through the second and fourth switches.

In the step of supplying electric power to the external stylus pen side, an operation of the analog amplifier is not required, and thus, the fifth switch S5 performs switching such that both of the two input terminals of the analog amplifier receive the reference signal, thus stabilizing the operation of the analog amplifier. That is, as illustrated in FIG. 12, the reference signal Vref is provided to the both input terminals of the analog amplifier Amp.

Figure 14:
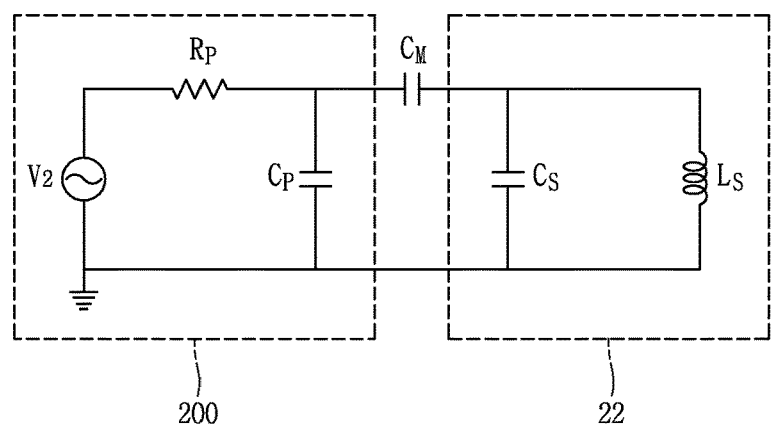
FIG. 14 is a conceptual view illustrating an equivalent circuit illustrating capacitive coupling according to an embodiment of the present disclosure.

In the electric power transmission mode, an AC voltage of V2 is applied to the TX line and the RX line of the touch panel, and resistance and capacitance of the TX line and RX line have Rp and Cp, respectively, thereby forming the transmission side configuration in the capacitive coupling as illustrated in FIG. 14.

Here, the reason why the two TX lines and two RX lines closest to where a touch position is detected in a capacitive manner and the same AC voltage is supplied to the four electrode lines according to the first embodiment of the present disclosure will be described.

An electric power supply principle of the present disclosure is a method of supplying electromagnetic energy using capacitive coupling. A distance between electrodes of a capacitor Cm forming capacitive coupling is very short compared with a wavelength of a generated electromagnetic wave. In this case, an electric field is similar to an electrostatic field. Thus, capacitance, one of quantities of electricity, may be defined, and a general AC theory may be applied to analysis of an operation of a circuit. Cm is mutual capacity formed between an electrode line (touch panel)) of a power transmission side and an electrode of a power receiving side (stylus pen).

It is assumed that, in a case in which only one electrode line of the power transmission side is focused, for example, in a case in which the TX1 is focused, a central position of the electrode of the power reception side is in a central line of TX1. Here, mutual capacity Cm TX1 between the electrode of the power reception side and TX1 is maximized. However, as the center of the electrode of the power reception side is moved from the central line of TX1 in a direction toward the TX2, the value of the Cm TX1 is gradually reduced. The reduced capacitance value is mutual capacity Cm_TX2 between the power reception side and the electrode. Thus, when the mutual capacity between the TX1 and the power reception side and the mutual capacity between the TX2 and the power reception side are added, the overall mutual capacity is uniformly maintained no matter where the electrode of the power reception side is (meanwhile, the mutual capacity may be changed according to a degree to which the pen tip forming the stylus pen is tilted as described with reference to FIGS. 17 through 29, hereinafter).

The maintaining of the overall mutual capacity uniformly is the same for RX1 and RX2. That is, in a case in which a central position of the electrode of the power reception side is in a central line of RX1, mutual capacity Cm_RX1 between the electrode of the power reception side and RX1 is maximized.

Thus, in a case in which a center of the electrode of the power reception side is within a range surrounded by TX1, TX2, RX1, and RX2, when the same AC voltage is applied to the four electrode lines, mutual capacity between the power transmission side and the power reception side is uniformly maintained no matter where the electrode of the power reception side is. That is, since a change in mutual capacity is not required to be considered, electric energy transmission conditions are uniform, and as a result, wireless power transmission using an RX line and a TX line of the touch panel may be easily controlled.

Hereinafter, a power supply principle will be described in detail.

The same AC voltage is supplied to four electrode lines of TX1, TX2, RX1, and RX2, but this will be described with reference to FIG. 14 illustrating an equivalent electric circuit in which the four electrode lines are illustrated as a single electrode line, for the purposes of description.

Although not shown, a resistance value illustrated in the touch panel electrode 50 is Rp.

As for resistance R and capacitance C, since four electrode lines are illustrated as equivalence, Rp may have a value of ¼ of resistance in each line, and Cp may have a value of four times of capacity in each line.

As well known, the RC circuit operates as a low pass filter. That is, a signal having a low frequency propagates without attenuation, but a high frequency is attenuated.

A frequency which starts to be significantly attenuated is called a cutoff frequency (the voltage is attenuated by −3 dB, that is, 30% is lowered), and in the RC circuit, it is expressed by Equation 7 below.

$$f_H = \frac{1}{2\pi R_P C_P} \quad \text{[Equation 7]}$$

Also, in the present disclosure, a frequency fP of the AC power V2 is used as frequency power lower than the cutoff frequency. That is, the AC power V2 of the present disclosure uses a frequency satisfying Equation 8 below.

$$f_P < \frac{1}{2\pi R_P C_P} \quad \text{[Equation 8]}$$

In the present disclosure, the frequency corresponding to Equation 8 is an upper limit of the frequency operating the circuit.

The power transmission side transmits electric energy to the power reception side through capacitive coupling. The power reception side accumulates the received electric energy in the LC circuit. When the electric energy is transmitted from the outside, the LC circuit starts to vibrate like energy consumption is zeroed.

That is, when the LC circuit of the power reception side is in a resonant state, the electric energy given from the outside is confined in the LC circuit. The electric energy reciprocally vibrates between L and C without energy loss, the resonated state continues. However, in actuality, since a resistance component exists, the energy is gradually consumed by the resistance, and as a result, an amplitude of the vibrational energy is attenuated to become extinct soon.

In the present disclosure, electric energy is constantly supplied from the AC power source installed on the touch panel side, and as long as the touch panel continuously supplies energy, the LC circuit of the stylus pen may be maintained in the resonated state. However, the LC circuit does not constantly accumulate the energy supplied from the touch panel side. For example, in the case of the capacitive coupling configuration of the present disclosure, when an amplitude of a voltage of the power transmission side and an amplitude of a voltage of the LC circuit of the power reception side are equal, the power transmission side cannot transmit energy to the power reception side any longer. That is, when voltages of both terminals of the coupling capacitance are equal, energy supply is stopped, entering an equilibrium state.

When the power transmission side supplies electric energy at a frequency identical to the resonance frequency of the LC circuit, the electric energy may be effectively accumulated in the LC circuit.

That is, $$f_P = \frac{1}{2\pi \sqrt{L_S C_S}} \quad \text{[Equation 9]}$$

When the power transmission side supplies electric energy of the frequency of Equation 9, the electric energy may be effectively accumulated in the LC circuit.

In order to accumulate a larger amount of electric energy in the LC circuit, the capacitive component CS of the LC circuit may be increased. However, if the CS value is too great, a time for the LC resonant circuit to reach the equilibrium state is lengthened. Meanwhile, if the CS value is too small, even though the power reception side transmits a signal to the power transmission side through the mutual capacitance Cm at a follow-up stage, the signal is attenuated to be smaller than a range of a signal for the analog amplifier to read it within a short time, and thus, the analog amplifier may have difficulty in detecting the signal. Thus, in a case in which a signal is transmitted from the pen, a reception side, to the touch panel, a transmission side, it is required to set a CS value for securing a time for the analog amplifier to stably detect the signal. Such a CS value may be variably modified according to environments of a touch panel in use.

The following process will be described with reference to the flow chart of FIG. 10.

After power transmission is performed through capacitive coupling by applying an AC voltage to selected TX line and RX line, the touch panel 200 receives a signal transmitted from the stylus pen as a power reception side (S105). That is, the stylus pen, a power reception side, transmits an electrical signal to the touch panel, a power transmission side.

Figure 13:
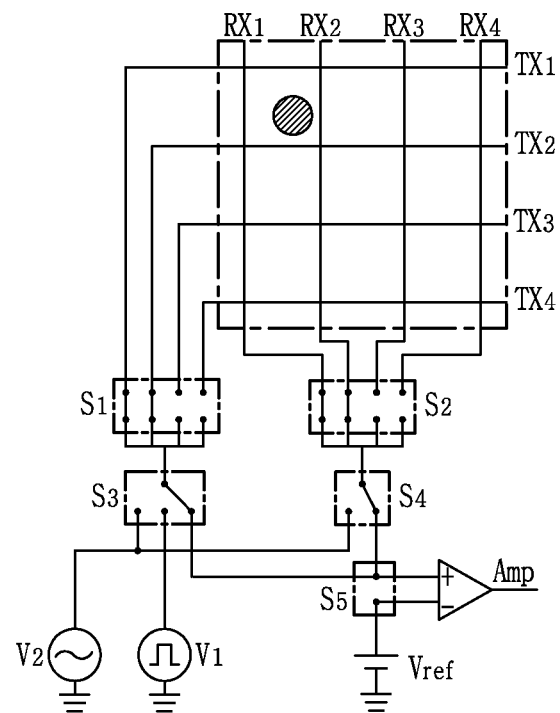

Here, the switches constituting the switching unit 120 of the touch panel are changed in a connection state as illustrated in FIG. 13.

That is, the first and second switches S1 and S2 maintain connection between the TX lines and the RX lines and the third switch S3 when power is transmitted thereto. In order to amplify and read the electrical signal transmitted from the touch panel, the fifth switch S5 disconnects the positive (+)

input terminal of the analog amplifier Amp from the Vref and connects the third switch S3 and the fourth switch S4 to the positive (+) input terminal of the analog amplifier Amp. The third switch S3 and the fourth switch S4 allow the first switch S1 and the second switch S2 to be connected to the positive (+) input terminal of the analog amplifier Amp, respectively, whereby connection of the second power source V2 of the touch panel side is released. Thus, supply of the electric energy by the second power source is stopped.

When the switches are connected in this manner, the electric energy accumulated in the LC circuit of the stylus pen side is returned as an electrical signal to the touch panel side through the mutual capacitance Cm, while maintaining vibration of the resonance frequency. That is, it is an electrical signal transmitted from the stylus pen.

Here, it is assumed that the value of C of the stylus pen is CS+ΔC and the resonance frequency of the LC circuit is slightly different from the frequency fP of the second power source V2 of the power transmission side. Even in this case, when electric energy is transmitted from the touch panel to the stylus pen, the LC circuit vibrates at a frequency slightly deviating from the resonance frequency due to injection of energy, and here, when the energy is injected into the LC circuit, the LC circuit be returned to a resonance frequency vibration state to minimize its energy consumption, and the injected energy is maintained and kept within the LC circuit.

$$f_S = f_P - \Delta f = \frac{1}{2\pi\sqrt{L_S(C_S + \Delta C)}} \quad \text{[Equation 10]}$$

By repeating the process, electric energy supplied from the touch panel is accumulated in the LC circuit of the stylus pen.

Thus, it is obvious that, even though the frequency of the second power source V2 of the touch panel is not the same as the resonance frequency of the LC circuit of the stylus pen, energy transmitted from the touch panel is accumulated in the LC circuit of the stylus pen.

Thus, the stylus pen may have a structure in which various constants of the LC circuit of the stylus pen is selected. Electric energy resonating the LC circuit may be transmitted from the second power source V2 of the touch panel having a fixed frequency. When the touch panel stops supply of electric energy, the touch panel may receive an electrical signal having various frequencies emitted from the stylus pen.

For example, when a structure in which a plurality of switches are provided in the stylus pen and each of the switches selects a resonance frequency having a different LC constant is configured, whenever the touch panel stops supply of electric energy, which of the switches in the stylus pen is pressed can be known. That is, in a case in which a command desired to be executed in each of the switches of the stylus pen is allocated in advance, when the user presses a corresponding switch of the stylus pen, a corresponding execution command may be transmitted to the touch panel.

Also, the LC circuit of the pen whose electric energy is transmitted to and received from a circuit of the touch panel through capacitive coupling may detect pen pressure of the pen (force applied by the user to the pen) by changing capacitance C.

That is, in a case in which the value of the capacitance C can be according to pen pressure of the pen applied by the user, an electrical signal transmitted from the pen may be received through the analog amplifier of the touch panel and a degree of pen pressure may be detected. For example, when the user presses the head (pen tip) of the pen when manipulating the stylus pen, the capacitance C value may be changed according to a magnitude of the pressing force. When the value of the capacitance C is changed in the LC circuit of the pen according to the force applied by the user to the pen, a command corresponding to the pen pressure may be performed by checking a frequency of the electrical signal transmitted again to the touch panel from the pen.

Figure 15:
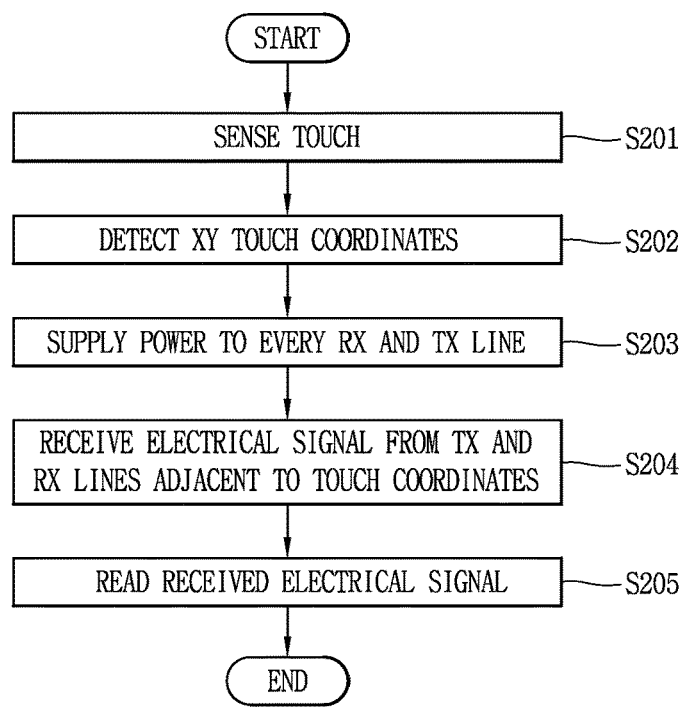
FIG. 15 is a flow chart illustrating a method of supplying an electrical signal through a touch panel according to a second embodiment of the present disclosure.

Hereinafter, an operation of a touch panel according to a second embodiment of the present disclosure will be described. FIG. 15 is a flow chart illustrating a method of wirelessly supplying power through a touch panel according to the second embodiment of the present disclosure.

First, an operation of the touch panel according to the first embodiment illustrated in FIG. 10 may be divided into a capacitive touch sensing mode (S101 to S103), a power supply mode (S104), and an electrical signal reception mode of a pen (S105 and S106) according to a connection state of switches forming the switching unit.

The flow chart illustrated in FIG. 15 may also be divided into a capacitive touch sensing mode (S201 and S202), a power supply mode (S203), and a mode for receiving an electrical signal from a pen (S204 and S205).

The second embodiment is different from the first embodiment in that, in the power supply mode in which an AC voltage is supplied to the TX lines and the RX lines of the touch panel, power is not supplied only to a selected portion of the TX lines and RX lines but the AC voltage is supplied to all the TX lines and RX lines in order to quickly supply power.

A method of wirelessly providing power using capacitive coupling by the touch panel and the LC circuit of the pen according to the second embodiment will be described.

First, like the first embodiment, in the capacitive touch sensing mode, in a state in which the switch connection state illustrated in FIG. 11 is maintained, a touch is sensed through scanning of TX lines and RX lines of the touch panel (S201), and XY coordinates of the touched position are detected (S202).

Next, in order to supply electric power to the touched pen, both the third switch S3 and the fourth switch S4 are controlled to be connected to the second voltage source V2 providing an AC voltage. The first switch S1 and the second switch S2 perform to switching such that all the TX lines and RX lines are connected to the third switch S3 and the fourth switch S4, so that all the TX lines and RX lines are connected to the second voltage source V2 (S203). As described above with reference to FIG. 12, when the same AC voltage is applied to the TX lines and RX lines, mutual capacitance between the power transmission side and the power reception side may be uniformly maintained regardless of position of the electrode of the power reception side.

Figure 16:
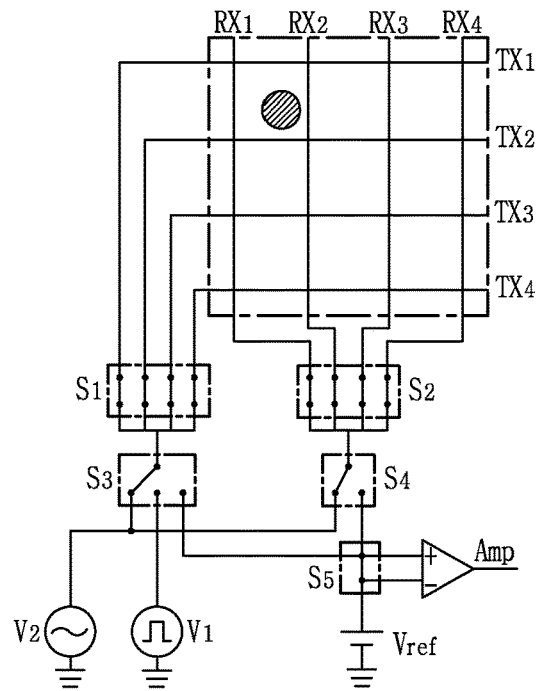
FIG. 16 is a conceptual view illustrating a configuration of a touch panel operated according to the second embodiment of the present disclosure.

Thus, there is need to consider a change in mutual capacity, and after the presence and absence of a touch and coordinates thereof are checked in a capacitive manner, the AC voltage may be applied to all the RX lines and TX lines in order to quickly supply electric power to the stylus pen side. A process speed may be higher than the case in which the AC voltage is supplied only specific lines as in the first embodiment. A circuit configuration in which the AC voltage is supplied from all the TX lines and RX lines is illustrated in FIG. 16.

After the AC voltage is applied to all the TX and RX lines in this manner, the switch configuration of the touch panel needs to be changed again in order to receive electric energy transmitted from the stylus pen. Here, in order to accurately recognize a frequency of an electrical signal transmitted from the stylus pen, two TX lines and two RX lines closest to the touch coordinates are connected to the analog amplifier. That is, as illustrated in FIG. 7, the first to fifth switches S1 to S5 should be connected, and a portion of an electrical signal, transmitted from the stylus pen and transmitted to the TX line, is moved to the analog amplifier through the first, third, and fifth switches, and a portion of the signal transmitted from the stylus pen and transmitted to the RX line is moved to the analog amplifier through the second, fourth, and fifth switches (S204).

Thereafter, a frequency is detected from a signal processed by the analog amplifier, and various operations are performed according to a user command corresponding to the detected frequency (S205).

According to the method of transmitting electric power of the present disclosure described above, there is no need to separately configure a circuit for transmitting electric power to the pen within the touch-based device such as a smartphone or a tablet PC, and thus, a thickness of the touch-based device may be reduced. Also, since only a circuit for wireless power transmission is added to the circuit of the touch panel and the frequency of the source voltage supplying the AC voltage from the TX line to the RX line of the touch panel is configured to be smaller than the cutoff frequency, the circuit may have a simple structure.

In the above, the method of detecting pen pressure applied from the stylus pen on the basis of the touch panel and the method of providing a voltage to the touch panel electrodes Tx and Rx to detect a touch point applied to the touch panel have been described.

Hereinafter, the stylus pen 20 transmitting and receiving an electrical signal to and from the touch panel described above in a capacitive coupling manner will be described in detail with reference to the accompanying drawings.

The energy, the electric energy, the voltage, the current, and the like, described above with reference to FIGS. 1 through 16 may be understood as being included in "electrical signal". Hereinafter, a signal transmitted and received between the touch panel and the stylus pen will be generally referred to as an "electrical signal". If necessary, terms such as a frequency, a resonance frequency, or an amplitude, characteristics of an electrical signal, will be used together.

Figure 17:
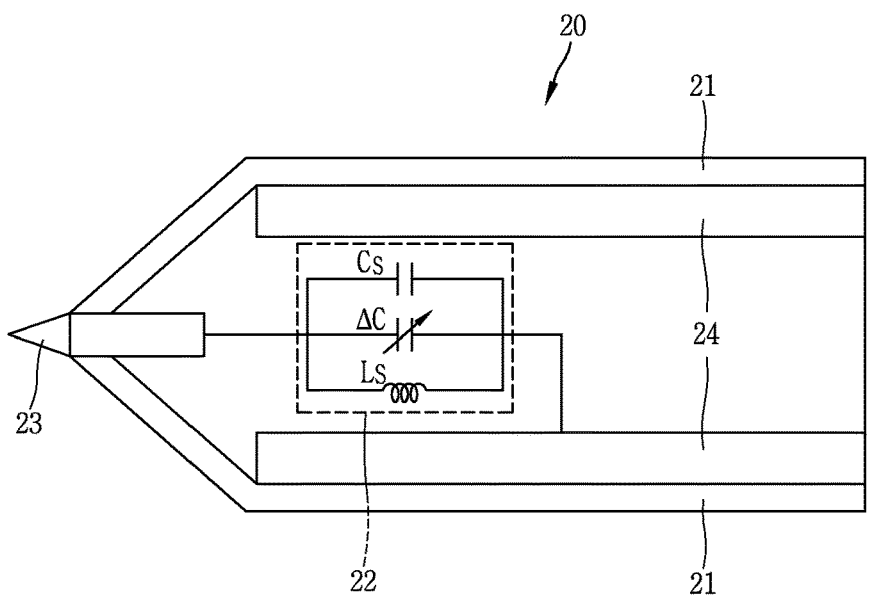
FIG. 17 is a conceptual view illustrating a stylus pen according to an embodiment of the present disclosure.

FIG. 17 is a conceptual view illustrating a stylus pen according to an embodiment of the present disclosure.

First, as described above, the mobile terminal 10 may have the stylus pen 20 as described above. Also, the mobile terminal 10 may include the touch panel 200 including a plurality of touch panel electrodes 50.

The stylus pen 20 may be formed to transmit and receive an electrical signal to and from the touch panel 200 using capacitive coupling. The stylus pen 20 for generating capacitive coupling with the touch panel may include a main body 21 and a pen tip 23 formed of a conductor and protruding outwardly from the main body 21 to apply a touch to the touch panel 200. Also, the stylus pen 20 may include an LC circuit 22 provided within the main body 21 and including an inductor Ls and capacitors Cs and ΔC. Here, the LC circuit 22 may be the pen circuit unit 22 and the LC resonant circuit described above. The LC circuit 22 may be electrically connected to the pen tip 23 such that capacitive coupling is generated between the LC circuit 22 and the touch panel 200. The electrical connection between the LC circuit 22 and the pen tip 23 will be described hereinafter. First, each component will be described.

The main body 21 serves as a case forming an outer appearance of the stylus pen 20. A space may be formed within the main body 21, and components forming the stylus pen 20 such as the LC circuit 22 or a conductive member 24 may be disposed in the space.

The main body 21 may be formed of various materials. For example, the main body 21 may be formed by injection-molding a synthetic resin or may be formed of a metal, for example, stainless steel (STS), aluminum (Al), or titanium (Ti).

Since the main body 21 forms the outer appearance of the stylus pen 20, it may be formed of any material as long as it has strength equal to or greater than reference strength for maintaining the outer appearance to a predetermined level. In detail, the main body 21 may include a conductive material or a non-conductive material, but preferably, in order to prevent an electrical signal from flowing by an object (for example, the user's hand) using the stylus pen 20, the main body 21 is formed of a non-conductive material. If an electrical signal flows by an object using the stylus pen 20, the electrical signal transmitted and received between the touch panel 200 and the stylus pen 20 through capacitive coupling may be changed to become unstable used for determining a touch point.

Meanwhile, the stylus pen 20 of the present disclosure may include the pen tip 23 protruding outwardly from the main body 21 and formed to apply a touch to the touch panel. The pen tip 23 may be formed of a conductor. In detail, the pen tip 23 may be formed such that a material forming the pen tip 23 is entirely formed of a conductor or only a portion forming a surface of the pen tip 23 is formed of a conductor.

Also, the pen tip 23 may be electrically connected to the LC circuit 22. Here, the electrical connection may refer to that the pen tip 23 formed of a conductor and the LC circuit 22 are connected by an object (for example, an electric wire) that is able to directly transmit and receive an electrical signal.

In the present disclosure, the pen tip 23 is formed of a conductor and the pen tip 23 and the LC circuit 22 are electrically connected, whereby a magnitude of an electrical signal transmitted and received through capacitive coupling between the touch panel 200 and the stylus pen 20 may be increased.

In detail, the capacitive coupling may be generated between the touch panel electrode 50 of the touch panel 200 and a capacitor forming the LC circuit 22 of the stylus pen 20. That is, capacitive coupling may be generated as stray capacitance CP present in the touch panel electrode 50 and the capacitor (Cs, ΔC) included in the LC circuit 22 are adjacent to each other. Also, as the capacitive coupling is generated, mutual capacitance Cm may be generated between the touch panel 200 and the stylus pen 20.

The electrical signal transmitted and received between the touch panel 200 and the stylus pen 20 may be related to the mutual capacitance Cm. That is, as the mutual capacitance Cm is increased, a magnitude of the transmitted and received electrical signal is increased.

Here, the increase in the magnitude of the electrical signal may be understood as including an increase in a magnitude of the electrical signal itself, an increase in a transmission and reception rate of the electrical signal, and an increase in an amount of the electrical signal.

In the present disclosure, the mutual capacitance Cm may be increased by electrically connecting the pen tip 23 and the LC circuit 22. That is, the pen tip 23 may be formed of a conductor and may be electrically connected to the LC circuit 22. Thus, the capacitor of the LC circuit 22 may have an effect of positioning in the pen tip 23. Thus, a distance between the touch panel electrode 50 of the touch panel 200 and the capacitor of the stylus pen 50 is shorter than before the LC circuit 22 is electrically connected to the pen tip 23 formed of a conductor. Here, the mutual capacitance Cm is increased as a distance between two objects (the touch panel electrode and the pen tip) forming mutual capacitance is reduced in terms of the capacitor. Thus, a magnitude of the electrical signal transmitted and received between the touch panel 200 and the stylus pen 20 is increased as the LC circuit 22 is electrically connected to the pen tip 22 formed of a conductor.

To sum up, the LC circuit 22 may be electrically connected to the pen tip 23 formed of a conductor such that capacitive coupling is generated between the LC circuit 22 and the touch panel. Also, an electrical signal transmitted and received between the touch panel 200 and the LC circuit 22 of the stylus pen 20 may be transmitted and received by way of the pen tip 23 formed of a conductor.

The stylus pen 20 may receive an electrical signal transmitted from the touch panel 200 through the pen tip 23 formed of a conductor, and supply the received electrical signal to the LC circuit 22 electrically connected to the pen tip 23. That is, resonance may occur by the electrical signal supplied from the pen tip 23 in the LC circuit 22.

Here, the LC circuit 22 may receive the electrical signal through the pen tip 23 formed of a conductor, rather than directly transmitting and receiving the electrical signal to and from the touch panel electrode 50 of the touch panel 200. In an embodiment of the to present disclosure, since the electrical signal is transmitted and received between the pen tip 23 as a conductor electrically connected to the LC circuit 22 and the touch panel 200, a magnitude of the electrical signal transmitted to the stylus pen 20 is increased. Thus, since the LC circuit 22 receives the electrical signal through the pen tip 23, it may rapidly enter a resonance state compared with the case in which the LC circuit 22 directly transmits and receives an electrical signal to and from the touch panel electrode 50 (the fact that the LC circuit quickly enters the resonance state according to an electrical signal transmitted from the touch panel has been described above, so a detailed description thereof will be omitted).

Meanwhile, the LC circuit 22 may further include a variable capacitor ΔC whose electric capacity is varied on the basis of pressure applied to the pen tip 23. That is, as described above, the variable capacitor may have capacitance (electric capacity) changed by force applied to the pen. Here, pressing the pen may refer to a touch operation of the stylus pen 22. In detail, a touch operation of the stylus pen 22 may refer to an operation of pressing the pen tip 23 provided in the stylus pen 22 to the touch panel 200.

When a touch operation of the stylus pen 22 is applied, the touch panel 200 may sense a touch point on the basis of a change in electric capacity of the variable capacitor. In detail, when the electric capacity of the variable capacitor is changed, an electrical signal generated in the LC circuit 22 of the stylus pen 20 is changed. The change in the electrical signal may refer to a change in a resonance frequency generated in the LC circuit 22.

Hereinafter, an electrical signal generated in the LC circuit 22 before pressure is applied to the pen tip 23 will be referred to as a first electrical signal. Also, as pressure is applied to the pen tip 23, electric capacity of the variable capacitor is changed, and thus, a changed electrical signal generated in the LC circuit 22 will be referred to as a second electrical signal. That is, the first electrical signal applied from the LC circuit 22 to the touch panel may be changed into the second electrical signal according to the change in the electric capacity.

In an embodiment of the present disclosure, the control unit 180 for sensing the second electrical signal and determining a touch point in the touch panel may be further included. As illustrated in FIG. 8, the control unit 180 may be connected to the touch panel 200. Also, the control unit 180 may determine a touch point applied by a touch operation of the stylus pen on the basis of the second electrical signal sensed in the touch panel 200 (contents related thereto will be described in detail hereinafter). Here, the technical features described in the pen signal detecting device 100, the pen pressure detecting unit 130, and the signal receiving unit 130 may be inferred and applied to the control unit 180 in the same or similar manner.

The first and second electrical signals transmitted from the stylus pen 20 to the touch panel 200 may be electrical signals generated in the LC circuit 22. Also, at least one of the first and second electrical signals may be transmitted to the touch panel 200 according to a capacitive coupling scheme through the pen tip 23 electrically connected to the LC circuit 22 and formed of a conductor.

As described above, at least one of the first and second electrical signals may be transmitted to the touch panel 200 through the pen tip 23 formed of a conductor. Thus, a magnitude of the first and second electrical signals received by the touch panel 200 may be increased.

To sum up, the control unit 180 may determine a touch point in the touch panel 200 on the basis of the second electrical signal transmitted to the touch panel 200. Here, as the magnitude of the second electrical signal sensed in the touch panel 200 is greater, the control unit 180 may more accurately recognize the touch operation by the stylus pen 20. Thus, as the pen tip 23 of the stylus pen 20 is formed of a conductor and is electrically connected to the LC circuit 22 generating the second electrical signal, a magnitude of the electrical signal (the second electrical signal) transmitted and received between the touch panel 200 and the stylus pen 20 through capacitive coupling may be increased.

In an embodiment of the present disclosure, the pen tip 23 may be modified to have various shapes to further increase a magnitude of the electrical signal transmitted and received. For example, the pen tip 23 may be formed to have a conic shape having one base side and one vertex. Also, the pen tip 23 having a conic shape may be disposed such that the vertex thereof is oriented to the outside of the main body 21.

In this state, when the stylus pen 20 is tilted in relation to the vertex, a magnitude of the electrical signal transmitted and received between the stylus pen 20 and the touch panel 200 through capacitive coupling may be increased in proportion to a degree to which the pen tip 23 is tilted in relation to the vertex. In detail, a magnitude of the electrical signal received by the stylus pen 20 and a magnitude of the second electrical signal transmitted from the stylus pen 20 may be increased in proportion to a degree to which the pen tip 23 is tilted in relation to the vertex.

As described above, mutual capacitance Cm may be generated between the stylus pen 20 and the touch panel 200 according to capacitive coupling. The mutual capacitance Cm may be changed according to the stray capacitance Cp formed in the touch panel electrode 50 of the touch panel 200 and the capacitor Cs of the stylus pen 20. In an embodiment of the present disclosure, since the LC circuit 22 and the pen tip 23 are electrically connected and the pen tip 23 is formed of a conductor, the mutual capacitance Cm may be varied according to a state (posture) of the pen tip 23 and the touch panel electrode 50.

As described above, as the pen tip 23 becomes close to the touch panel electrode 50, the mutual capacitance Cm may be increased. Thus, a magnitude of the electrical signal transmitted and received between the touch panel 200 and the stylus pen 20 may be increased.

In addition, when the pen tip 23 having a conic shape is tilted, an available area between a side surface of the pen tip 23 and the touch panel electrode 50 is increased and a distance between the side surface of the pen tip 23 and the touch panel electrode 50 is reduced. In terms of characteristics of the capacitor, the mutual capacitance Cm is increased as a distance between two objects (the touch panel electrode and the pen tip) forming the mutual capacitance is reduced, and increased as an available area of the two objects is increased.

That is, when the pen tip 23 having a conic shape is tilted, the mutual capacitance Cm generated according to capacitive coupling is increased in terms of the characteristics of the capacitor in proportion to an area and in inverse proportion to a distance, and thus, a magnitude of the electrical signal transmitted and received between the stylus pen 20 and the touch panel 200 may be increased in proportion to a degree to which the pen tip 23 is tilted.

The above descriptions may be more clarified with reference to the accompanying drawings.

Figure 18:
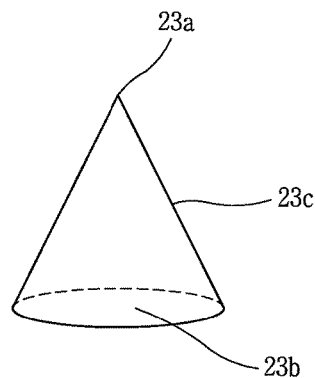
FIG. 18 is a conceptual view illustrating a pen tip according to an embodiment of the present disclosure.
Figure 19:
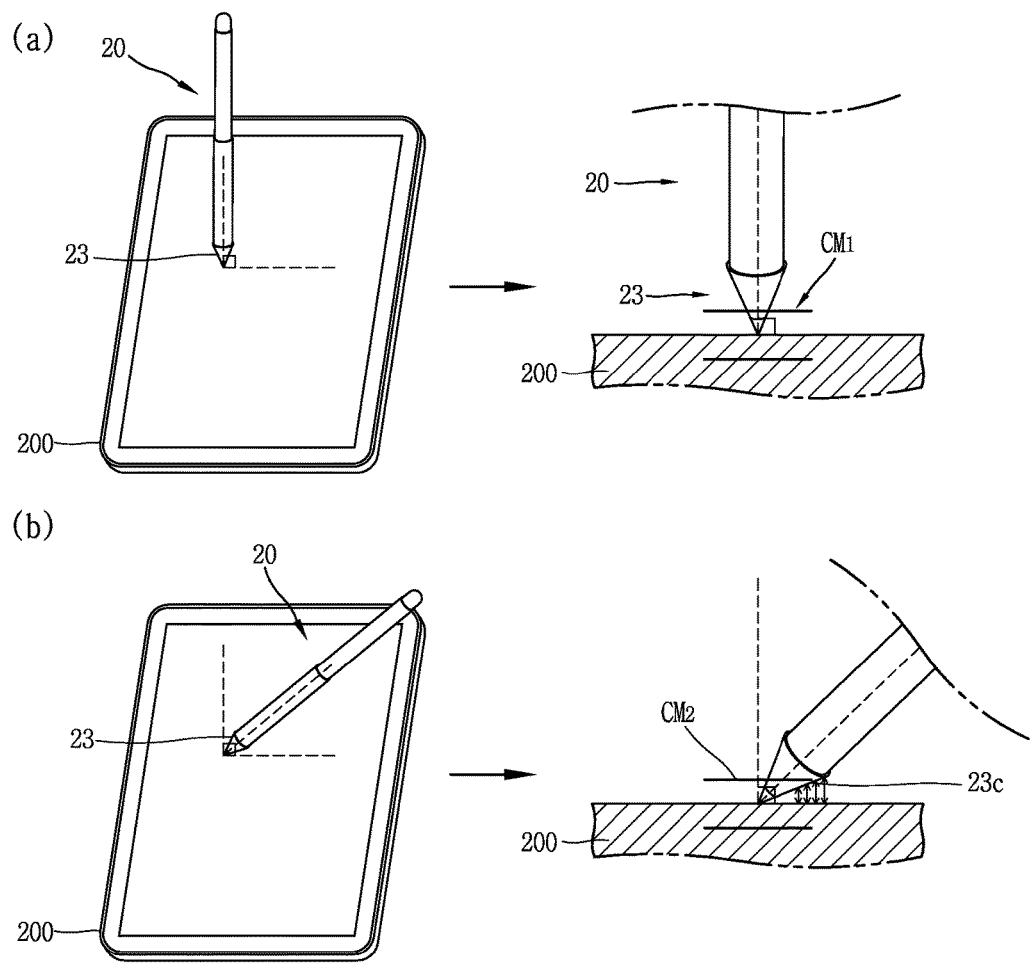
FIG. 19 is a conceptual view illustrating an increase in a magnitude of an electrical signal when a stylus pen having a pen tip of FIG. 18 is tilted.
Figure 20:
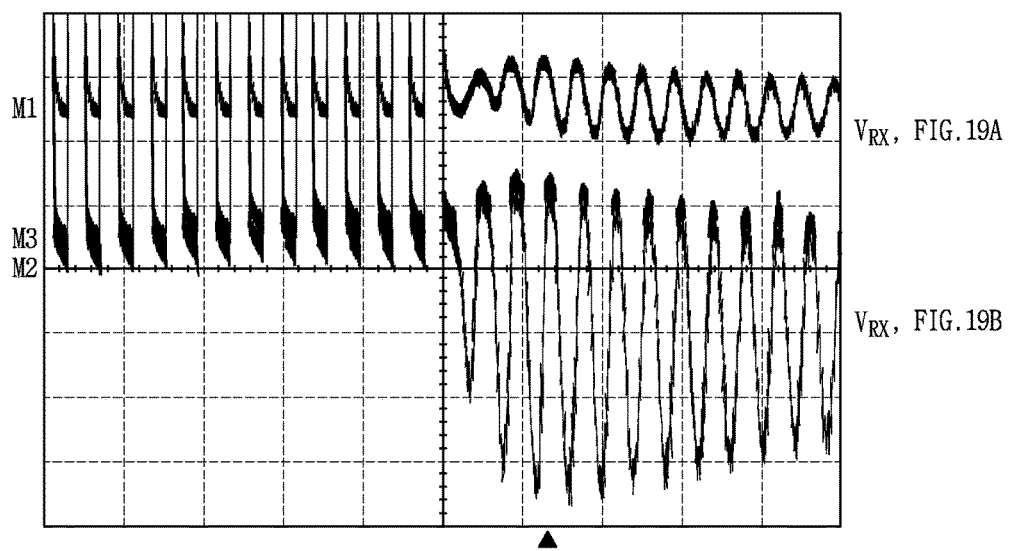
FIG. 20 is a conceptual view illustrating a magnitude of an electrical signal measured when the stylus pen is tilted in FIG. 19.

FIG. 18 is a conceptual view illustrating a pen tip according to an embodiment of the present disclosure, FIG. 19 is a conceptual view illustrating an increase in a magnitude of an electrical signal when a stylus pen having a pen tip of FIG. 18 is tilted, and FIG. 20 is a conceptual view illustrating a magnitude of an electrical signal measured when the stylus pen is tilted in FIG. 19.

As illustrated in FIG. 18, the pen tip 23 may be formed to have a conic shape including one vertex 23a and one base side 23b. Also, the pen tip 23 may have a side surface 23c connecting the vertex 23a and the base side 23b. The pen tip 23 formed to have a conic shape may be disposed such that the vertex 23a is oriented to the outside of the main body 21.

The conic shape may be various according to a shape of the base side 23b. For example, in a case in which the base side of the pen tip 23 has a quadrangular shape, the pen tip 23 may be a quadrangular pyramid, and in a case in which the base side has a circular shape, the pen tip 23 may be a cone. However, the conic shape of the pen tip 23 is not limited thereto and may include any conic shape in which a distance between the side surface of the cone and the touch panel is adjacent as the pen tip 23 is tilted in relation to the vertex thereof.

(a) FIG. 19 illustrates that a touch is applied in a state in which the stylus pen 20 with the pen tip 23 having a conic shape is vertical with respect to the touch panel 200. Meanwhile, (b) of FIG. 19 illustrates that a touch is applied in a state in which the stylus pen 20 with the pen tip 23 having a conic shape is tilted based on the vertex with respect to the touch panel 200.

It can be seen that, in the case of (a) of FIG. 19, mutual capacitance CM1 generated according to capacitive coupling between the pen tip 23 and the touch panel 200 is smaller than mutual capacitance CM2 generated in the case of (b) of FIG. 19. That is, in the case of (b) of FIG. 19, as the pen tip 23 having a conic shape is tilted on the basis of the vertex 23a, an available area between the side surface 23c of the pen tip 23 and the touch panel 200 is increased and a distance between the side surface 23c of the pen tip 23 and the touch panel 200 is reduced, CM2 has capacity greater than that of CM1.

FIG. 20 illustrates data obtained by measuring an electrical signal sensed in the touch panel when a touch is applied in a state in which the pen tip having a conic shape is vertical with respect to the touch panel ((a) of FIG. 19) and when a touch is applied in a state in which the pen tip is tilted ((b) of FIG. 19).

Referring to FIG. 20, a magnitude of the electrical signal (voltage VRx) sensed by the sensing electrode Rx of the touch panel electrode is greater when a touch is applied by tilting the pen tip 23 having a conic shape than that when a touch is applied vertically.

Figure 21:
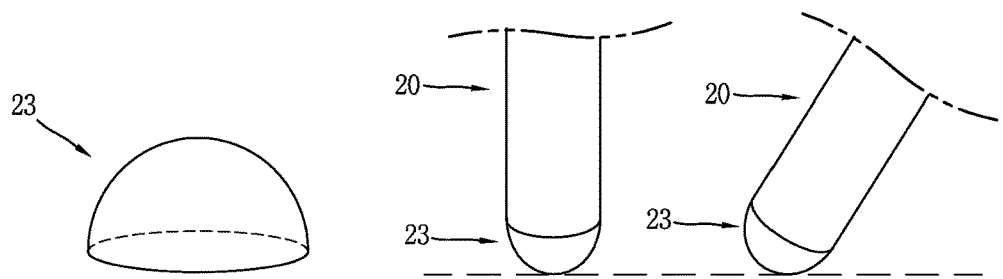
FIG. 21 is a conceptual view illustrating a case in which a pen tip has a hemispherical shape.

FIG. 21 is a conceptual view illustrating a case in which the pen tip 21 has a hemispherical shape.

As illustrated in FIG. 21, the pen tip 23 may be formed to have a hemispherical shape. Also, the pen tip 23 formed to have a hemispherical shape may be disposed such that the base side of the hemisphere is in contact with the main body.

In a case in which the pen tip 23 has a hemispherical shape, an electrical signal transmitted and received between the stylus pen 20 and the touch panel 200 may be uniformly maintained. That is, a magnitude of the electrical signal transmitted and received between the touch panel 200 and the stylus pen 20 may be uniformly maintained even when the stylus pen 20 is tilted.

Also, in this case, the present disclosure may have an effect that the pen tip 23 is formed of a conductor and a magnitude of an electrical signal transmitted and received between the stylus pen and the touch panel is increased when the pen tip 23 is electrically connected to the LC circuit. Also, in the present disclosure, since the pen tip 23 has a hemispherical shape, the electrical signal having the increased magnitude may be uniformly maintained. Thus, stability of the electrical signal transmitted and received between the touch panel 200 and the stylus pen 20 may be increased.

Although not shown, the pen tip 23 may be formed to have a combination of a conic shape and a hemispherical shape. In detail, the pen tip 23 may basically have a conic shape and only the vertex portion may have a hemispherical shape. In this case, a magnitude of the transmitted and received electrical signal may be maintained when the pen tip 23 is tilted to have a slope equal to or lower than a preset slope, and may be increased when the pen tip 23 is tilted to have a slope greater than the preset slope.

This will be described in detail on the basis of the components included in the stylus pen 20.

The stylus pen 20 according to an embodiment of the present disclosure may include the main body 21, the pen tip 23 formed of a conductor and protruding to an outer side of the main body 21 and formed to apply a touch to a touch panel, and the LC circuit 22 provided within the main body 21, including an inductor and a capacitor, and electrically connected to the pen tip such that capacitive coupling is generated between the LC circuit 22 and the touch panel. The LC circuit 22 may transmit and receive an electrical signal to and from the touch panel 200 by using capacitive coupling.

The electrical signal may be transmitted and received between the touch panel 200 and the LC circuit 22 through the pen tip formed of a conductor. To this end, the pen tip 23 is formed of a conductor and may be electrically connected to the LC circuit 22.

The LC circuit 22 may receive the electrical signal transmitted from the touch panel 200 through the pen tip 23 formed of a conductor, and may be formed to generate resonance using the received electrical signal. Here, in a state in which resonance occurs, the LC circuit may apply an electrical signal to the touch panel 200. Here, the electrical signal may be a first electrical signal.

The pen tip 23 may have a conic shape having one base side 23b and one vertex 23a, and may be disposed such that the vertex is oriented to the outside of the main body. A magnitude of an electrical signal received by the pen tip 23 may be increased in proportion to a degree to which the pen tip is tilted in relation to the vertex 23a.

The LC circuit 22 may further include a variable capacitor ΔC whose electric capacity is varied on the basis of pressure applied to the pen tip. The LC circuit 22 may change a first electrical signal applied to the touch panel into a second electrical signal on the basis of a change in the electric capacity of the variable capacitor according to a touch operation of the stylus pen. In detail, a touch operation of the stylus pen 20 may be understood as applying pressure to the pen tip 23. That is, when pressure is applied to the pen tip 23 according to a touch operation of the stylus pen 20, electric capacity of the variable capacitor ΔC may be changed. The LC circuit 22 may generate an electrical signal having a different resonance frequency as the electric capacity is varied. That is, the LC circuit 22 may change the first electrical signal generated before pressure is applied to the pen tip 23 into a second electrical signal different from the first electrical signal on the basis of pressure applied to the pen tip 23.

The second electrical signal may be transmitted to the touch panel 200 through the pen tip 23 formed of a conductor. To this end, the pen tip 23 may be formed of a conductor and may be electrically connected to the LC circuit 22.

The pen tip 23 may have a conic shape having one base side 23b and one vertex 23a, and may be disposed such that the vertex is oriented to the outside of the main body. Also, a magnitude of the second electrical signal transmitted from the pen tip 23 may be increased in proportion to a degree to which the pen tip 23 is tilted in relation to the vertex 23a.

Meanwhile, the pen tip 23 may be formed as a hemisphere and may be disposed such that the base side of the hemisphere is in contact with the main body. In this case, an electrical signal transmitted and received between the touch panel 200 and the pen tip 23 may be uniformly maintained even though the pen tip is tilted.

As described above, in an embodiment of the present disclosure, the pen tip 23 forming the stylus pen 20 may be formed of a conductor and may be electrically connected to the LC circuit 22. Thus, a magnitude of the electrical signal transmitted and received between the touch panel 200 and the stylus pen 20 in a capacitive coupling manner may be increased.

Also, in an embodiment of the present disclosure, the pen tip 23 may be formed to have a conic shape, whereby a magnitude of an electrical signal transmitted and received between the touch panel 200 and the stylus pen 20 in capacitive coupling manner may be increased as the pen tip 23 is tilted.

Hereinafter, a method of determining a touch point applied by the stylus pen in to the touch panel when the pen tip of the stylus pen has a conic shape will be described in detail with reference to the accompanying drawings.

Figure 22:
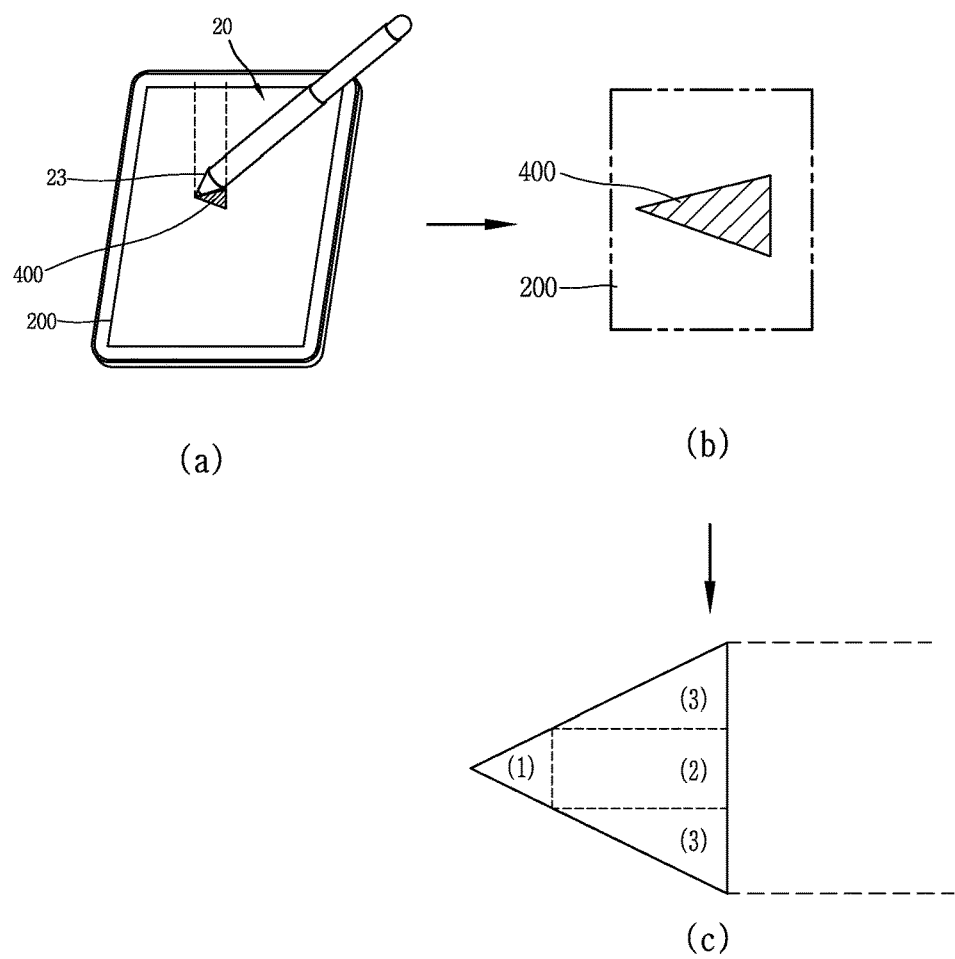
FIG. 22 is a conceptual view illustrating a method of determining a touched point on the basis of an electrical signal sensed in a touch panel.
Figure 23:
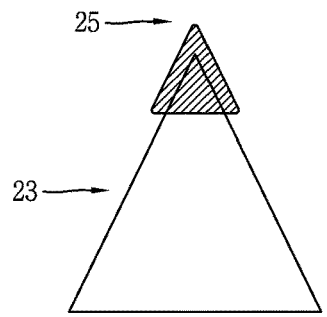
FIGS. 23 and 24 are conceptual views illustrating a method of determining a touched point on the basis of an electrical signal sensed in a touch panel when a non-conductive protective member is formed in a pen tip.
Figure 24:
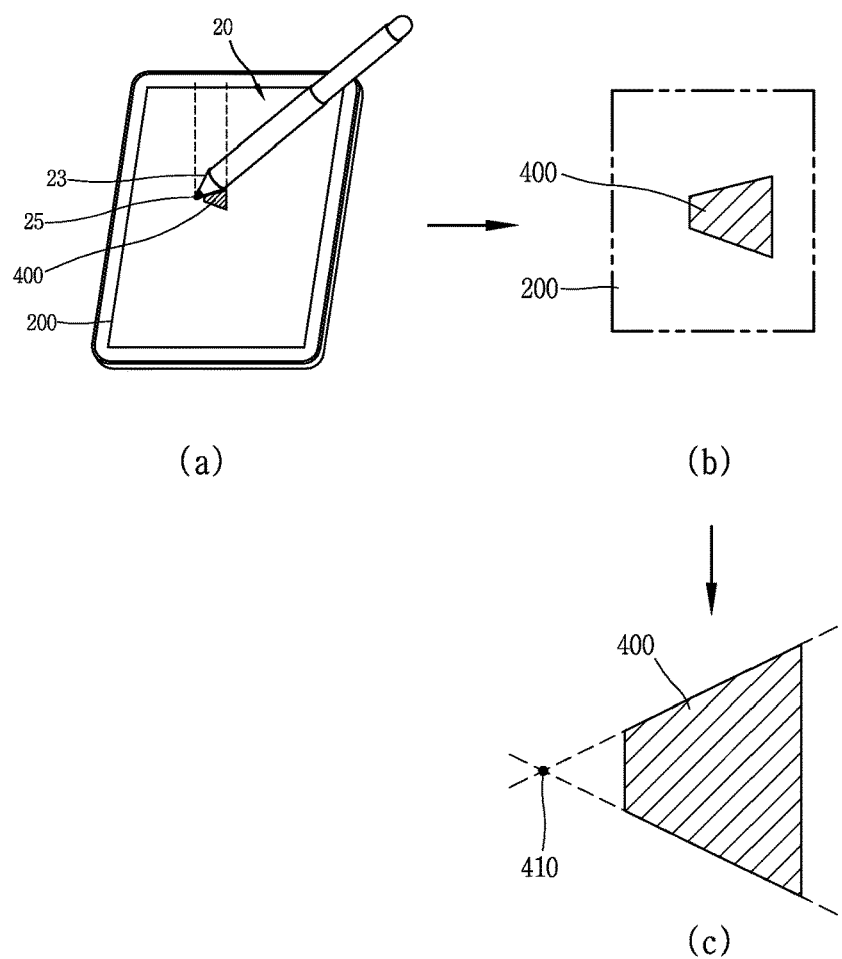

FIG. 22 is a conceptual view illustrating a method of determining a touched point on the basis of an electrical signal sensed in a touch panel, and FIGS. 23 and 24 are conceptual views illustrating a method of determining a touched point on the basis of an electrical signal sensed in a touch panel when a non-conductive protective member is formed in a pen tip.

As described above, the stylus pen 20 converts a first electrical signal applied from the LC circuit 22 to the touch panel 200 into a second electrical signal on the basis of pressure applied to the touch panel 200, and transmits the same. The controller 180 may detect the second electrical signal transmitted to the touch panel 200 and determine a touch point of the touch panel 200.

The second electrical signal may be transmitted to the touch panel 200 through the pen tip 23 formed of a conductor. The contents described above with reference to FIGS. 3 through 16 may be inferred and applied to a method of receiving the second electrical signal (electrical signal having a changed resonance frequency) by the touch panel 200 in the same or similar manner.

Here, in a case in which the pen tip 233 has a conic shape, a magnitude of the second electrical signal transmitted from the stylus pen may be increased in proportion to a degree to which the pen tip 23 is tilted in relation to the vertex thereof.

The control unit 180 may determine a point at which a magnitude of the second electrical signal has a threshold value or greater, among points at which the second electrical signal is detected, as a touch point. For example, the point at which the magnitude of the second electrical signal has the threshold value or greater may be a point to which a touch has been applied by the vertex 23c of the pen tip 23 in the touch panel 200.

Meanwhile, as the pen tip 23 has a conic shape and the pen tip 23 is tilted in relation to the vertex, a second electrical signal having a magnitude equal to or greater than the threshold value may be sensed in one region of the touch panel 200. For example, as illustrated in (a) of FIG. 22, as the pen tip 23 having a conic shape is tilted, the second electrical signal having a magnitude equal to or greater than the threshold value may be detected in one region 400 of the touch panel 200.

The one region 400 may be varied according to a degree to which the pen tip having a conic shape is tilted, a shape of the pen tip 23, and the like. For example, the one region 400 may have a shape of a shadow of the pen tip having the conic shape in a tilted state formed when parallel rays are emitted vertically to the touch panel. That is, the one region 400 may have a shape generated as the pen tip 23 having a conic shape in a tilted state is orthogonally projected to the touch panel 20.

For example, in a case in which a touch is applied in a state in which the pen tip 23 having a conic shape is tilted, the one region 400 may have a triangular shape.

In a case in which the second electrical signal having a magnitude equal to or greater than the threshold value is received in one region 400 of the touch panel 200 as the stylus pen 20 is tilted, the touch point may be determined on the basis of the detected one region.

Here, when the second electrical signal having a magnitude equal to or greater than the threshold value is detected in one region, it may mean that a magnitude of an electrical signal transmitted and received in a capacitive coupling manner is increased.

The magnitude of the second electrical signal detected in the one region may be varied according to a distance between the touch panel and a side surface of the pen tip as described above with reference to (b) of FIG. 19. A magnitude of the second electrical signal sensed in the one region 400 may be greatest in region (1) and reduced in order of regions (2) and (3) as illustrated in (c) of FIG. 22. The region (1) may be a region in which a portion of the side surface 23c of the pen tip having the conic shape adjacent to the vertex 23a is orthogonally projected.

In (c) of FIG. 2, the regions (1), (2), and (3) are distinguishably illustrated for the purposes of description, but in actuality, a magnitude of the second electrical signal is gradually reduced from (1) to (3). This is because a magnitude of the second electrical signal detected in the touch panel 200 is increased as a distance between the touch panel and the side surface of the pen tip is reduced.

The controller 180 may determine a touch point 410 (please refer to FIG. 24) on the basis of the magnitude of the second electrical signal detected in the one region 400. For example, when the one region 400 has a regular triangle, the touch point 410 may be determined as a point 410 where a magnitude of the second electrical signal is largest in the one region 400 as illustrated in (c) of FIG. 22. The point 410 at which the electrical signal has the largest magnitude may be a point at which the vertex in which a distance between the pen tip 23 and the touch panel 200 is closest (or a portion of the side surface of the pen tip most adjacent to the vertex) is orthogonally projected.

Also, the control unit 180 may determine a touch point on the basis of a shape of the one region 400. For example, when the one region 400 has a shape of an equilateral triangle, the touch point may be determined as a point corresponding to a vertical angle of the equilateral triangle.

Meanwhile, as illustrated in FIG. 23, a non-conductive protective member 25 may be formed on the vertex of the pen tip 23. The non-conductive protective member 25 serves to prevent damage to the touch panel 200 when the pen tip 23 presses (touches) the touch panel 200.

In a case in which a touch is applied to the touch panel 200 in a state in which the non-conductive protective member 25 is formed on the pen tip 23 of the stylus pen 20, the touch panel 200 may receive a second electrical signal transmitted from the pen tip 23. This is because, since an electrical signal is transmitted and received between the stylus pen 20 and the touch panel 200 in a capacitive coupling manner, a direct touch is not required (the touch is a touch for changing a resonance frequency of the LC circuit)

As illustrated in (a) of FIG. 24, when a touch is applied to the touch panel 200 in a state in which the non-conductive protective member is formed on the vertex of the pen tip 23, as illustrated in (b) of FIG. 24, a second electrical signal having a magnitude equal to or greater than a threshold value may be detected in one region 400 of the touch panel 200.

Here, when a shape of the one region 400 corresponds to a preset shape, the control unit 180 may determine the point outside of the one region as a touch point.

For example, the one region may have a conic shape and may have a trapezoid shape as the pen tip in which the non-conductive protective member is formed in the vertex is orthogonally projected. Here, when the preset shape is the trapezoid shape, as illustrated in (c) of FIG. 24, the touch point may be a point 410 at which extended lines of hypotenuses connecting the longest side of the trapezoid and the side opposing the longest side cross each other.

As described above, the touch panel of the present disclosure may detect the second electrical signal received from the stylus pen such that the second electrical signal is greater in proportion to a degree to which the stylus pen with the pen tip having a conic shape is tilted. Also, in a case in which the second electrical signal is detected in the one region of the touch panel, the control unit may determine a touch point through the method described above with reference to FIGS. 22 to 24. Thus, in the present disclosure, a touch recognition rate of the stylus pen may be increased by increasing a magnitude of the electrical signal transmitted and received between the touch panel and the stylus pen as the stylus pen is tilted. Also, since a touch point is determined on the basis of an electrical signal applied to one region, accuracy of the touch point may be significantly increased.

Meanwhile, the stylus pen of the present disclosure may further include a conductive member 24 provided within the main body and electrically connected to the LC circuit to increase a magnitude of the electrical signal. As illustrated in FIG. 17, the conductive member 24 may be provided within the main body 21 and may be electrically connected to the LC circuit 22. Here, the electrical connection may refer to that the conductive member 24 and the LC circuit 22 are connected by an object (for example, an electric wire) which is able to directly transmit and receive an electrical signal, like the LC circuit 22 and the pen tip 23 are electrically connected.

Figure 25:
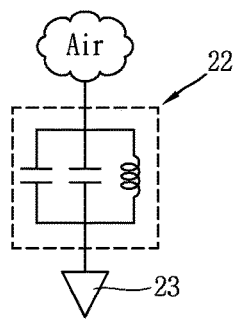
FIG. 25 is a conceptual view illustrating a conductive member for increasing a magnitude of an electrical signal within a stylus pen.
Figure 25:
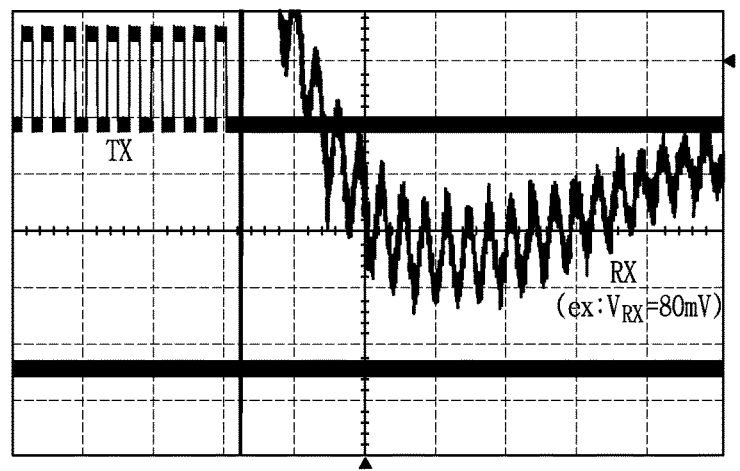
Figure 25:
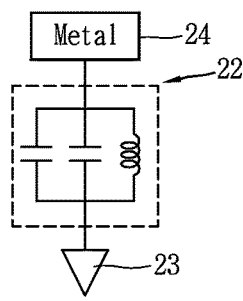
Figure 25:
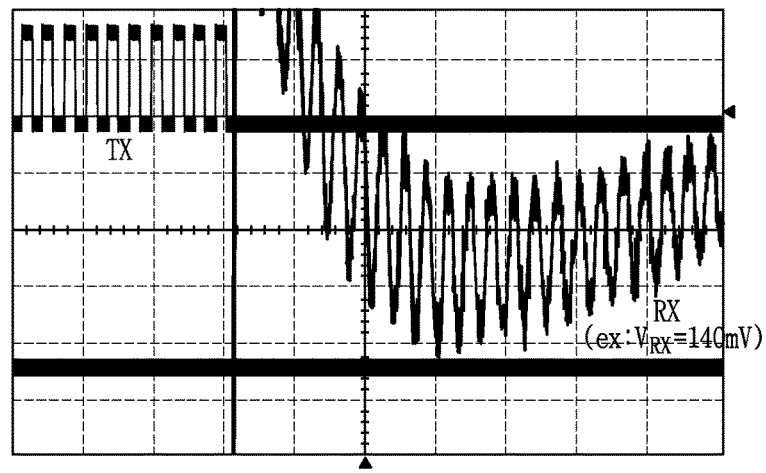

As illustrated in FIG. 25, in the present disclosure, a magnitude of an electrical signal transmitted and received between the touch panel 200 and the stylus pen 20 may be increased by electrically connecting the LC circuit 22 and the conductive member 24.

It can be seen that, an electrical signal detected by the sensing electrode RX of the touch panel electrode when a touch is applied to the touch panel 200 in a state in which the LC circuit 22 and the conductive member 24 are not connected as illustrated in (a) of FIG. 25 is smaller than an electrical signal detected by the sensing electrode RX of the touch panel electrode when a touch is applied to the touch panel 200 in a state in which the LC circuit 22 and the conductive member 24 are connected as illustrated in (b) of FIG. 25. That is, it can be seen that, in a case in which the LC circuit 22 and the conductive member 24 are electrically connected in the stylus pen 20, the magnitude of the electrical signal transmitted and received between the stylus pen 20 and the touch panel 200 is increased. The conductive member 24 may be understood as playing a role of a virtual ground (GND).

As discussed above, in the present disclosure, the magnitude of the electrical signal transmitted and received between the stylus pen 20 and the touch panel 200 may be increased by electrically connecting the LC circuit and the conductive member.

Meanwhile, in the present disclosure, the magnitude of the electrical signal transmitted and received between the stylus pen 20 and the touch panel 200 may be increased by deforming a shape of the touch panel electrode forming the touch panel.

Figure 26:
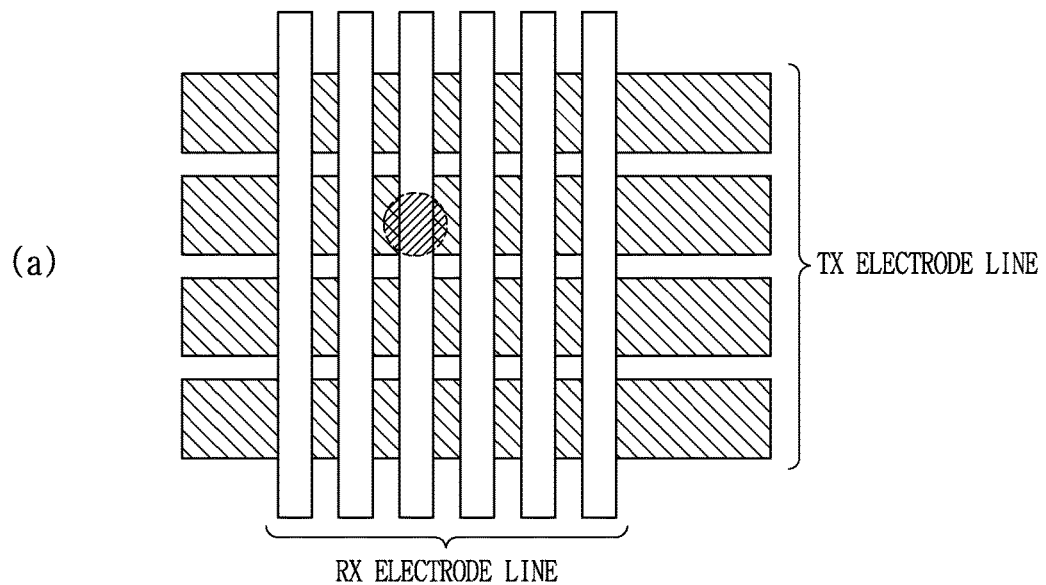
FIG. 26 is a conceptual view illustrating a touch panel electrode included in a touch panel according to an embodiment of the present disclosure.
Figure 26:
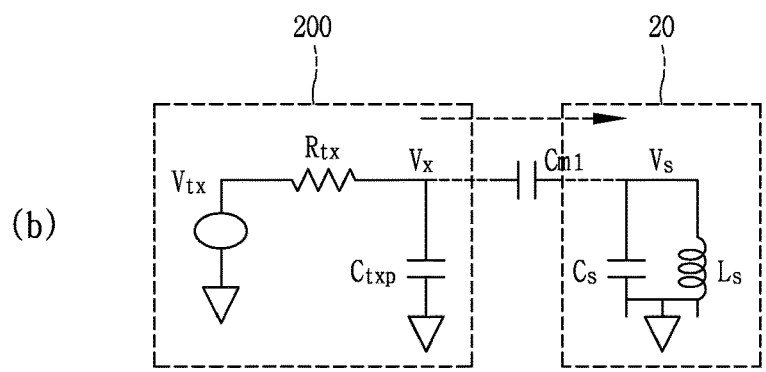
Figure 26:
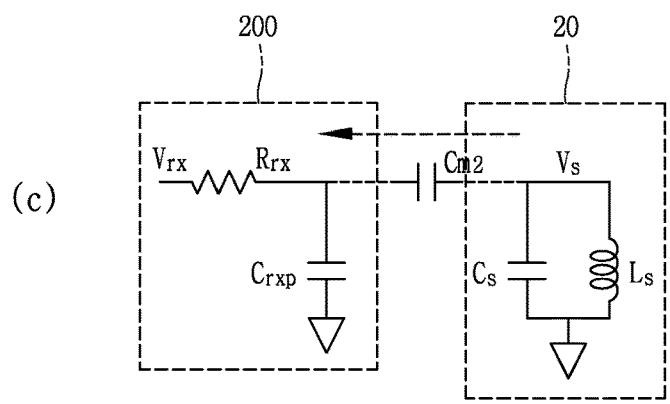

As illustrated in (a) of FIG. 26, a plurality of touch panel electrodes included in the touch panel may include a plurality of driving electrodes (Tx electrode lines) arranged and a plurality of sensing electrodes (Rx electrode lines) arranged to cross the driving electrodes.

The driving electrode serves to transmit an electrical signal to the stylus pen 20. Also, the sensing electrode serves to detect an electrical signal (second electrical signal) received from the stylus pen 20.

Also, in order to increase a detection rate of the electrical signal received from the stylus pen, a width of the driving electrode may be formed to be greater than that of the sensing electrode. That is, in the present disclosure, the width of the driving electrode is formed to be greater than that of the sensing electrode, whereby a magnitude of the electrical signal transmitted and received between the stylus pen 20 and the touch panel 200 may be increased. Here, increasing a magnitude of the electrical signal may refer to increasing a detection rate of detecting an electrical signal transmitted from the stylus pen, from the touch panel.

This will be described in detail with reference to (b) and (c) of FIG. 26 hereinafter.

In (b) of FIG. 26, an equivalent circuit for transmitting an electrical signal (electric power) to the stylus pen 20 from the Tx electrode line among the touch panel electrodes is illustrated.

As described above, the AC voltage generating unit 110 or the power supply unit 110 may be connected to the Tx electrode line. Vtx denotes a signal voltage applied to the Tx electrode line, Rtx denotes equivalent resistance of the Tx electrode line, Ctxp denotes stray capacitance of a tx electrode, Cm1 denotes mutual capacitance generated through capacitive coupling between the TX electrode line (or Ctxp) of the touch panel and the capacitor Cs of the stylus pen, Cs denotes capacitance provided in the LC circuit of the stylus pen, and Ls denotes inductance provided in the LC circuit of the stylus pen.

Vs supplied to the stylus pen 20 by an electrical signal transmitted from the touch panel 200 may satisfy the relationship of Equation 11 below.

$$V_S \frac{C_{m1}}{C_{m1}+C_S} V_X, V_{TX} \propto V_X \qquad \text{[Equation 11]}$$

Meanwhile, an equivalent circuit of transmitting an electrical signal to the RX electrode line among the touch panel electrodes from the stylus pen 20 is illustrated in (c) of FIG. 26.

Vrx denotes a magnitude of a signal detected from the RX electrode line, Rrx denotes equivalent resistance of the RX electrode line, Crxp denotes stray capacitance of the RX electrode line, Cm2 is mutual capacitance generated between the RX electrode line Crxp of the touch panel and the capacitor Cs of the stylus pen through capacitive coupling, Cs denotes capacitance provided in the LC circuit of the stylus pen, and Ls denotes inductance provided in the LC circuit of the stylus pen.

A magnitude Vrx with which an electrical signal received from the stylus pen 20 is sensed at the RX electrode line of the touch panel may satisfy a relationship of Equation 12 below.

$$Vrx \propto \frac{C_{m2}}{C_{m2}+C_{rxp}} V_S \qquad \text{[Equation 12]}$$

Equation 13 may be derived using Equation 11 and Equation 12.

$$Vrx \propto \frac{C_{m2}}{C_{m2}+C_{rxp}} \times \frac{C_{m1}}{C_{m1}+C_S} \qquad \text{[Equation 13]}$$

Here, since Crxp≫Cm2 is satisfied, Equation 13 may be expressed as Equation 14.

$$Vrx \propto \frac{C_{m2}}{C_{rxp}} \times \frac{C_{m1}}{C_{m1}+C_S} \qquad \text{[Equation 14]}$$

That is, it can be seen that a magnitude Vrx of the signal detected from the sensing electrode of the touch panel 200 is in proportion to the product of Cm2 and Cm1 and is in inverse proportion to the magnitude of Crxp.

It can be seen that, when the magnitude Vrx of the signal detected from the sensing electrode of the touch panel 200 is in proportion to the product of Cm2 and Cm1, Cm2 and Cm1 are increased according to the configuration in which the pen tip and the LC circuit are electrically connected, the configuration in which the pen tip is formed of a conductor, and the configuration in which the pen tip having the conic shape is tilted.

Also, Crxp is in proportion to a line width of the RX electrode line of the sensing electrode. Thus, as a width of the sensing electrode is reduced, a detection rate (size) of the electrical signal received from the stylus pen 20 is increased.

Thus, in the present disclosure, the magnitude of the electrical signal sensed in the touch panel may be increased by forming the width of the driving electrode to be larger than the width of the sensing electrode. In other words, in the present disclosure, a detection rate of the electrical signal received from the stylus pen may be increased by forming the width of the sensing electrode to be smaller than the width of the driving electrode.

Figure 27:
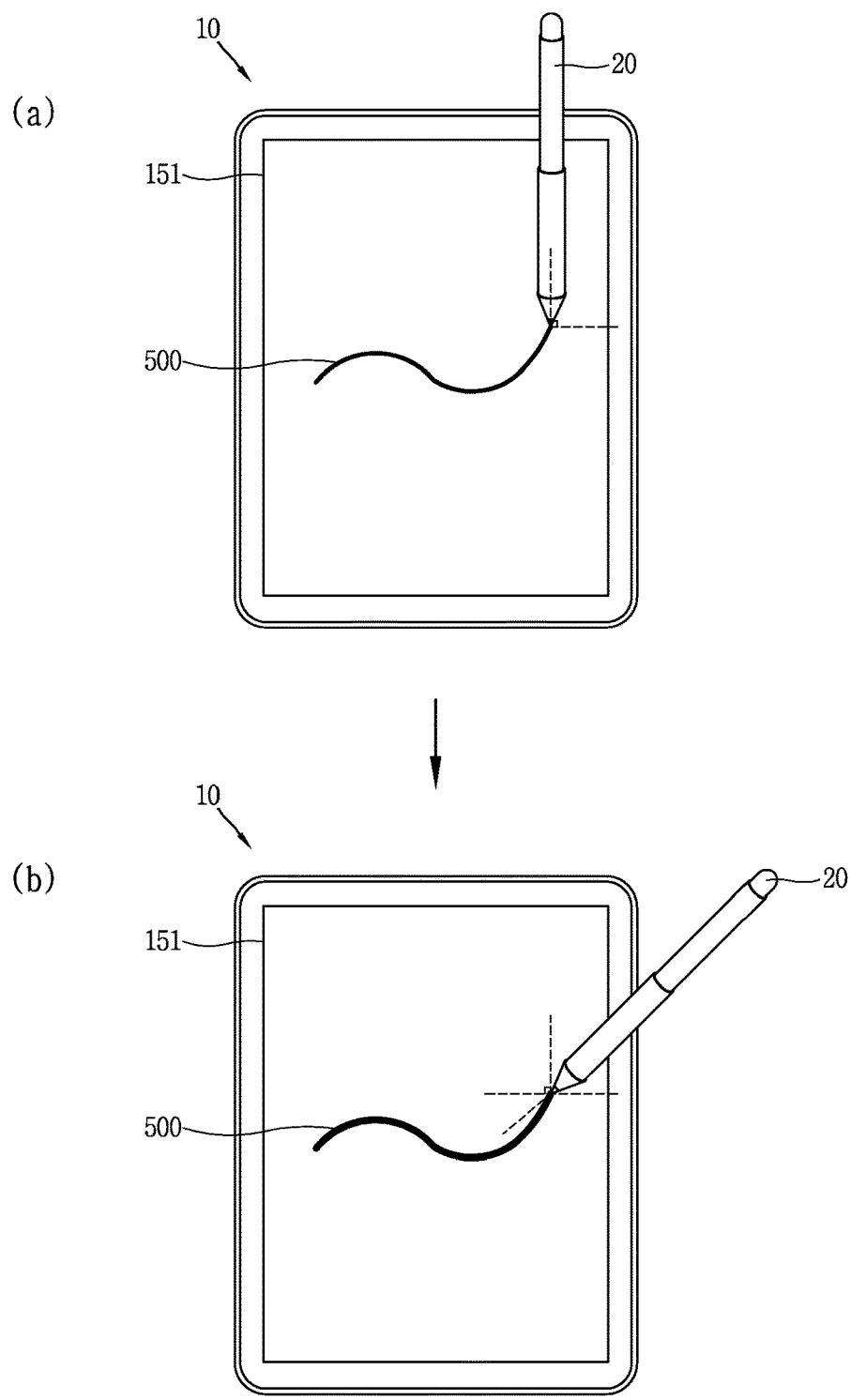
FIGS. 27 through 29 are conceptual views illustrating a method of performing various functions on the basis of tilting of a stylus pen according to an embodiment of the present disclosure.
Figure 28:
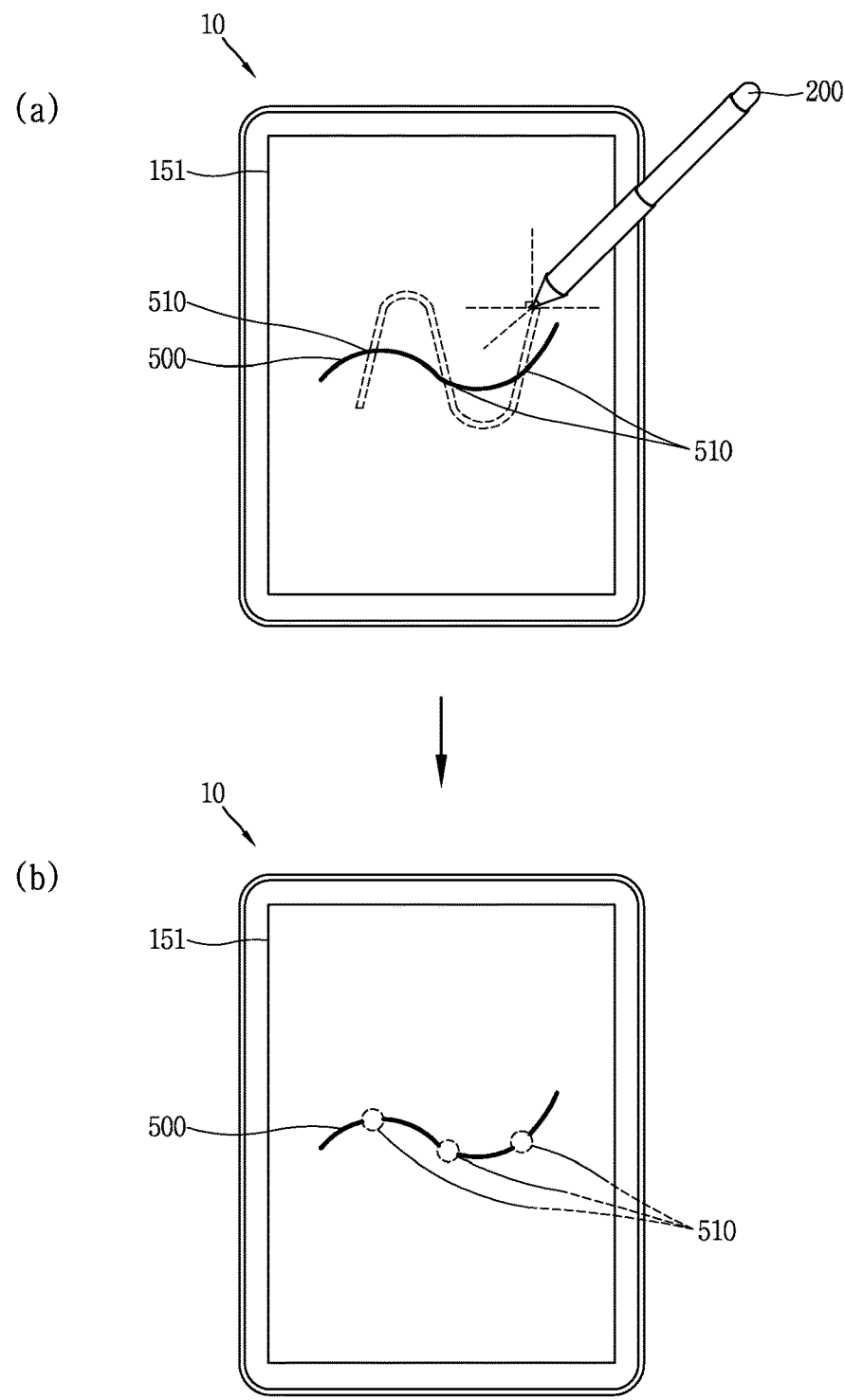
Figure 29:
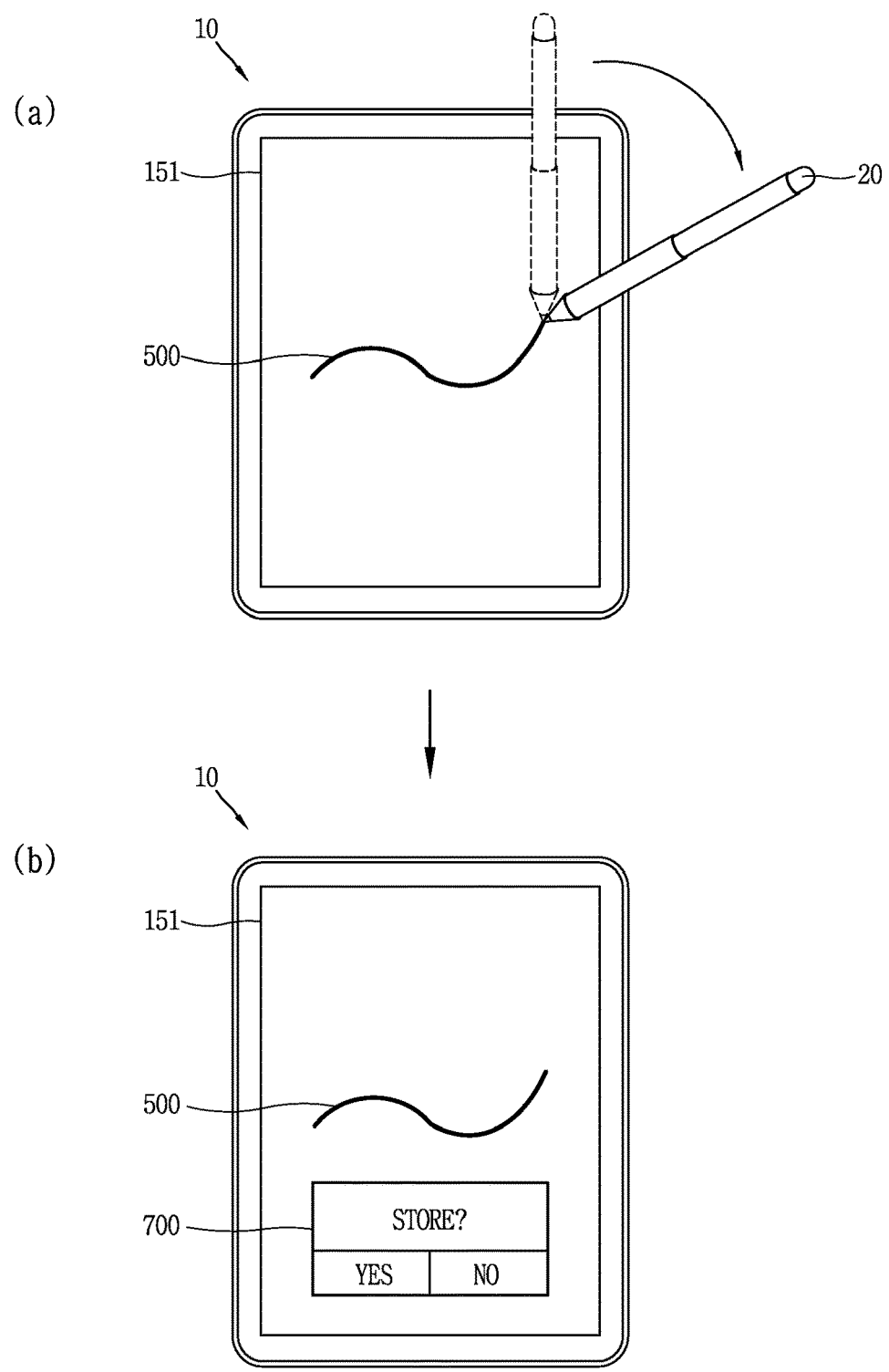

Meanwhile, in the present disclosure, various functions may be performed on the basis of tilting of the stylus pen. FIGS. 27 through 29 are conceptual views illustrating a method of performing various functions on the basis of tilting of a stylus pen according to an embodiment of the present disclosure.

First, referring to FIG. 8, the mobile terminal 10 according to an embodiment of the present disclosure may include a display unit 151 disposed to overlap the touch panel 200. Also, the present disclosure may include the control unit 180 outputting an image corresponding to a touch trace of the stylus pen on the display unit 151 on the basis of a touch applied by the stylus pen 20.

In detail, an image 500 may be displayed on the display panel 60 using a display driving circuit 62 under the control of the control unit 180. The image 500 displayed on the display panel 60 may be output on the display unit 151.

Meanwhile, the control unit 180 may output the image 500 in different manners according to a degree to which the pen tip 23 is tilted.

The degree to which the pen tip is tilted may be determined on the basis of a size of one region in which an electrical signal having a magnitude equal to or greater than a threshold value is detected in the touch panel 200.

The pen tip 23 may be formed of a conductor and may be electrically connected to the LC circuit 22. Also, the pen tip 23 may have a conic shape. Contents that a magnitude of electrical signal transmitted and received between the touch panel and the stylus pen in a capacitive coupling manner is increased as the pen tip 23 having the foregoing features is tilted will be replaced with the above descriptions.

That is, the control unit 180 may determine a size of one region of the touch panel 200 in which an electrical signal (second electrical signal) having a magnitude equal to or greater than the threshold value, and may determine a degree to which the pen tip 23 (stylus pen) is tilted on the basis of the size of the one region.

For example, the degree to which the pen tip 23 is tilted may be increased as the size of the one region of the touch panel in which the second electrical signal having a magnitude equal to or greater than a threshold value is sensed is increased.

The image 500 corresponding to the touch trace may include a line corresponding to the touch trace. The control unit 180 may display at least one of a thickness of the line and a color of the image to be different according to a degree to which the stylus pen 20 is tilted.

For example, as illustrated in (a) of FIG. 27, in a case in which a touch is applied in a state in which the stylus pen 20 is vertical with respect to the touch panel 200, the control unit 180 may display the image 500 corresponding to the touch trace on the display unit 151. Meanwhile, as illustrated in (b) of FIG. 27, when a touch is applied in a state in which the stylus pen 20 is tilted, the controller 180 may output an image 500 corresponding to a touch trace applied in a state in which the stylus pen 20 is tilted such that a thickness of a lines of the image 500 is greater than that of the image 500 generated as the touch is applied in a state in which the stylus pen 20 is in a vertical state. However, this is merely an example, the control unit 180 may display the line to be thicker or thinner according to a degree to which the stylus pen 20 is tilted. Also, the control unit 180 may control a color of the image (line) to be different or a type of the line (for example, a straight line or a dotted line) according to a degree to which the stylus pen 20 is tilted.

Meanwhile, in a state in which the image 500 is output by a touch of the stylus pen 20, the control unit 180 may perform various functions as a drag touch is applied in a state in which the pen tip (stylus pen) is tilted at a slope equal to or greater than a preset slope.

One of the various functions may be a function of deleting an image 510 overlapping a trace of the drag touch from the output image 500.

For example, as illustrated in (a) of FIG. 28, the image 500 may output on the display unit 151. The image 500 may be an image which has been generated on the basis of the method described above with reference to FIG. 27. In this state, the control unit 180 may determine whether the stylus pen 20 is tilted at a slope equal to or greater than the preset slope. For example, whether the stylus pen 20 is tilted at a slope equal to or greater than the preset slope may be determined according to whether a size of one region of the touch panel 200 in which an electrical signal (second electrical signal) having a magnitude equal to or greater than a threshold value is sensed is equal to or greater than a preset size.

When a drag touch is applied in a state in which the stylus pen 20 is tilted at a slope equal to or greater than the preset slope, the control unit 180 may delete the image 510 overlapping a trace of the drag touch from the output image 500 as illustrated in (b) of FIG. 28.

Meanwhile, the control unit 180 may perform various functions according to whether the stylus pen 20 is tilted at a speed equal to or greater than a preset speed.

When the stylus pen 20 is tilted at a speed equal to or greater than a preset speed, it may mean that a slope of the stylus pen 20 that applies a touch to the touch panel 200 is tilted at a slope equal to or greater than a reference slope for a reference period of time.

The control unit 180 may determine whether the stylus pen 20 is tilted at a speed equal to or greater than the preset speed according to whether a size of the one region 400 of the touch panel 200 in which the second electrical signal having a magnitude equal to or greater than a threshold value is sensed is increased or decreased to have a size equal to or greater than a reference size for a reference period of time.

The reference size may refer to a size of one region generated as the pen tip is orthogonally projected to the touch panel in a state in which the pen tip is tilted to correspond to the reference slope.

When it is determined that the stylus pen 20 is tilted at a speed equal to or higher than the preset speed, the control unit 180 may perform various functions.

For example, the various functions may be an ON/OFF function of the display unit, an execution function of a preset application, a function of converting into a home screen page, a storage function regarding an image output on the display unit, a function of deleting the entirety regarding an image output on the display unit, and the like.

For example, a storage function regarding an image output on the display unit will be described with reference to FIG. 29.

As illustrated in (a) of FIG. 29, an image 500 corresponding to a touch trace of the stylus pen 20 may be output on the display unit 151. Thereafter, the stylus pen 20 may be tilted at a speed equal to or greater than the preset speed in relation to the touch panel. When a region of the touch panel 200 in which the second electrical signal having a magnitude equal to or grater than a threshold value is sensed is increase to have a size equal to or greater than a reference size within a reference time, the control unit 180 may determine that the stylus pen 20 is tilted at a speed equal to or greater than the preset speed.

Thereafter, as illustrated in (b) of FIG. 29, on the basis of the tilting of the stylus pen 20 at the speed equal to or greater than the preset speed, the control unit 180 may output notification information 700 for storing the image output on the display unit 151.

Meanwhile, the contents described with reference to FIG. 29 may be performed on the basis of the fact that the tilt of the stylus pen 20 is tilted at a slope equal to or greater than the preset slope, in a state in which a touch is applied to one point of the touch panel 200 by the stylus pen 20. That is, while the first electrical signal received from the stylus pen 20 is being detected at one point of the touch panel 200, when the second electrical signal is sensed in one region of the touch panel 200 as the stylus pen 20 is tilted at a slope equal to or greater than the preset slope, the control unit 180 may perform the functions described above with reference to FIG. 29.

As described above, according to an embodiment of the present disclosure, an electrical signal may be transmitted and received with the stylus pen by using the existing touch panel. Thus, a separate power supply device formed as a coil may be omitted, and thus, cost may be reduced and a thickness of the mobile terminal may be further reduced.

Also, according to an embodiment of the present disclosure, an electrical signal may be supplied to the stylus pen through capacitive coupling, and a touch may be applied to the touch panel through an electrical signal generated in a resonance state. Thus, the stylus pen configured with only a simple circuit, without a separate power supply unit, may be provided, and thus, cost may be reduced and a weight of the stylus pen may be further reduced.

Also, according to an embodiment of the present disclosure, by electrically connecting the LC circuit provided in the stylus pen and the pen tip formed of a conductor, a magnitude of an electrical signal transmitted and received between the stylus pen and the touch panel in a capacitive coupling manner may be increased. That is, in an embodiment of the present disclosure, since the pen tip is formed of a conductor and is electrically connected to the LC circuit, a distance between the capacitor of the LC circuit and the touch panel electrode may be reduced. Here, according to the capacitive coupling scheme, as a distance is closer, an electrical signal may be easily transmitted and received according to the characteristics of the capacitor. Thus, in an embodiment of the present disclosure, a touch recognition rate based on the stylus pen may be significantly increased.

Also, according to an embodiment of the present disclosure, since the pen tip formed of a conductor has a conic shape, a magnitude of an electrical signal transmitted and received between the touch panel and the stylus pen may be increased as the pen tip is tilted. That is, according to the capacitive coupling scheme, when a cross-sectional area is increased, an electrical signal may be more easily transmitted and received according to the characteristics of the capacitor. Thus, the problem that a recognition rate is degraded when the stylus pen is tilted in transmitting and receiving an electrical signal using inductive coupling according to the related art may be solved, and in addition, a touch recognition rate based on the stylus pen may be further increased by tilting the stylus pen.

Also, according to an embodiment of the present disclosure, in a case in which an electrical signal having a magnitude equal to or greater than a threshold value is sensed in one region of the touch panel as the pen tip formed to have a conic shape is tilted, a touch point may be determined according to a preset scheme. Thus, in an embodiment of the present disclosure, a magnitude of an electrical signal transmitted and received between the touch panel and the stylus pen may be increased as the stylus pen is tilted, and a problem in which accuracy of a touch point is degraded as the electrical signal is detected in one region may be solved.

Also, according to an embodiment of the present disclosure, a size of a region of the touch panel in which an electrical signal having a magnitude equal to or greater than a threshold value is sensed may be changed as the pen tip of the stylus pen is tilted. That is, in an embodiment of the present disclosure, different functions may be performed on the basis of tilting of the stylus pen. Thus, the present disclosure may provide a new user interface capable of providing different functions according to tilting of the stylus pen.

Also, according to an embodiment of the present disclosure, since a width of the driving electrode is greater than a width of the sensing electrode, a recognition rate of an electrical signal received from the stylus pen may be increased.

The exemplary embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

The invention claimed is:

1. A mobile terminal having a stylus pen, the mobile terminal comprising:
a touch panel having a plurality of touch panel electrodes;
a display disposed to overlap the touch panel;
a controller operably coupled with the display; and
a stylus pen configured to transmit and receive an electrical signal to and from the touch panel using capacitive coupling,
wherein the stylus pen comprises:
a main body;
a pen tip formed of a conductor and protruding to outside of the main body to apply a touch to the touch panel; and
an LC circuit provided within the main body, configured to include an inductor and a capacitor, and electrically connected to the pen tip to generate capacitive coupling between the touch panel and the stylus pen,
wherein the controller is configured to cause the display to:
display an image corresponding to a touch trace of the stylus pen on the basis of a touch applied by the stylus pen; and
display the image in different manners according to a degree to which the pen tip is tilted, and
wherein, in a state in which the image is displayed, when a drag touch is applied in a state in which the pen tip is tilted at a slope equal to or greater than a preset slope, the controller is further configured to delete the image overlapping a trace of the drag touch.

2. The mobile terminal of claim 1, wherein the electrical signal is transmitted and received between the touch panel and the LC circuit through the pen tip formed of a conductor.

3. The mobile terminal of claim 2, wherein the stylus pen receives an electrical signal transmitted from the touch panel through the pen tip formed of a conductor, and supplies the received electrical signal to the LC circuit electrically connected to the pen tip to cause resonance to occur in the LC circuit.

4. The mobile terminal of claim 3, wherein the pen tip has a conic shape having one base side and one vertex and is disposed such that the vertex is oriented to an outer side of the main body, and
a magnitude of the electrical signal received by the stylus pen is increased in proportion to a degree to which the pen tip is tilted in relation to the vertex.

5. The mobile terminal of claim 2, wherein the LC circuit further comprises a variable capacitor whose capacitance is varied on the basis of pressure applied to the pen tip, and
the touch panel detects a touch point on the basis of a change in the capacitance of the variable capacitor according to a touch operation of the stylus pen.

6. The mobile terminal of claim 5, wherein a first electrical signal applied from the LC circuit to the touch panel is converted into a second electrical signal according to a change in the capacitance, and
the controller is further configured to sense the second electrical signal to determine a touch point in the touch panel.

7. The mobile terminal of claim 6, wherein the second electrical signal is transmitted to the touch panel through the pen tip formed of a conductor.

8. The mobile terminal of claim 7, wherein the pen tip has a conic shape having one base side and one vertex and is disposed such that the vertex is oriented to an outer side of the main body, and
a magnitude of the second electrical signal transmitted from the stylus pen is increased in proportion to a degree to which the pen tip is tilted in relation to the vertex.

9. The mobile terminal of claim 8, wherein the controller is further configured to determine a point at which a magnitude of the second electrical signal is equal to or greater than a threshold value, as a touch point, among points at which the second electrical signal is detected.

10. The mobile terminal of claim 9, wherein, in a case in which the second electrical signal having a magnitude equal to or greater than the threshold value is received in one region of the touch panel as the stylus pen is tilted, the touch point is determined on the basis of the detected one region.

11. The mobile terminal of claim 10, wherein a magnitude of the second electrical signal detected in the one region is varied according to a distance between the touch panel and a side surface of the pen tip, and the controller is further configured to determine the touch point on the basis of the magnitude of the second electrical signal detected in the one region.

12. The mobile terminal of claim 11, wherein the touch point is determined as a point at which the second electrical signal is the greatest.

13. The mobile terminal of claim 11, wherein:

a non-conductive protective member is provided on the vertex of the pen tip; and when a shape of the one region corresponds to a preset shape, the controller is further configured to determine a point outside of the one region, as the touch point.

14. The mobile terminal of claim 2, wherein the pen tip is formed as a hemisphere and is disposed such that a base side of the hemisphere is in contact with the main body, and the electrical signal transmitted and received between the touch panel and the stylus pen is uniformly maintained even when the stylus pen is tilted.

15. The mobile terminal of claim 1, wherein the stylus pen further includes a conductive member provided within the main body and electrically connected to the LC circuit to increase a magnitude of the electrical signal.

16. The mobile terminal of claim 1, wherein the plurality of touch panel electrodes comprise:

a plurality of driving electrodes in array; and a plurality of sensing electrodes arranged to intersect with the plurality of driving electrodes, wherein a width of each of the plurality of driving electrodes is larger than a width of each of the plurality of sensing electrodes.

17. The mobile terminal of claim 1, wherein:

the pen tip has a conic shape having one base side and one vertex and is disposed such that the vertex is oriented to an outer side of the main body; and a degree to which the pen tip is tilted is determined on the basis of a size of the one region of the touch panel in which the electrical signal having a magnitude equal to or greater than the threshold value is detected.

18. The mobile terminal of claim 1, wherein:

an image corresponding to the touch trace includes a line corresponding to the touch trace; and the controller is further configured to cause the display to display at least one of a thickness or a color of the line differently according to a degree to which the stylus pen is tilted.

19. The mobile terminal of claim 1, wherein:

the electrical signal is transmitted to the touch panel through the pen tip; and the controller is further configured to determine one region of the touch panel at which a magnitude of the electrical signal is equal to or greater than a threshold value as a touch point when the electrical signal is received at the one region of the touch panel.

* * * * *